(12) United States Patent
Ge et al.

(10) Patent No.: US 9,155,141 B2
(45) Date of Patent: *Oct. 6, 2015

(54) MULTI-PATH CONSTANT CURRENT DRIVING CIRCUIT

(75) Inventors: Liang'an Ge, Hangzhao (CN); Xiaoli Yao, Zhejiang (CN); Guichao Hua, Zhejiang (CN); Xinke Wu, Zhejiang (CN); Lijun Ren, Zhejiang (CN)

(73) Assignee: INVENTRONICS (HANGZHOU), INC., Hangzhou, Zhejiang (CN)

( * ) Notice: Subject to any disclaimer, the term of this patent is extended or adjusted under 35 U.S.C. 154(b) by 686 days.

This patent is subject to a terminal disclaimer.

(21) Appl. No.: 13/511,049

(22) PCT Filed: Nov. 15, 2010

(86) PCT No.: PCT/CN2010/078716
§ 371 (c)(1),
(2), (4) Date: May 21, 2012

(87) PCT Pub. No.: WO2011/060701
PCT Pub. Date: May 26, 2011

(65) Prior Publication Data
US 2012/0274136 A1    Nov. 1, 2012

(30) Foreign Application Priority Data

Nov. 21, 2009    (CN) .......................... 2009 1 0225966
Nov. 21, 2009    (CN) .......................... 2009 2 0273352

(51) Int. Cl.
*H02J 1/00*    (2006.01)
*H02J 3/00*    (2006.01)

(52) U.S. Cl.
CPC ....... *H05B 33/0815* (2013.01); *H02M 3/33523* (2013.01); *H05B 33/0827* (2013.01); *H02M 2001/008* (2013.01); *H02M 2001/0064* (2013.01); *Y10T 307/414* (2015.04)

(58) Field of Classification Search
CPC ................ H02M 3/33523; H02M 2001/0064; H02M 2001/008; H02M 7/493; H02M 2001/007; H02M 7/44; H02M 7/48; H02M 7/487; H02M 1/32; H02M 1/12; H02M 1/4208; H02M 2001/0032; H02M 2001/0077; H02M 3/1584; H02M 3/285; H05B 33/0827; H05B 33/0815; H02J 1/00
USPC ......................................... 307/11, 31, 32, 82
See application file for complete search history.

(56) References Cited

U.S. PATENT DOCUMENTS

| | | |
|---|---|---|
| 4,562,338 A | 12/1985 | Okami |
| 4,567,379 A | 1/1986 | Corey et al. |
| 7,196,483 B2 | 3/2007 | Wey et al. |
| 7,358,684 B2 | 4/2008 | Wey et al. |
| 7,362,596 B2 | 4/2008 | Gjerde et al. |
| 7,567,444 B2 * | 7/2009 | Chen et al. |
| 7,843,143 B2 | 11/2010 | Kang |
| 8,629,664 B2 * | 1/2014 | Ge et al. |
| 2006/0284569 A1 | 12/2006 | Wey et al. |
| 2007/0126369 A1 * | 6/2007 | Meng et al. |
| 2008/0252222 A1 * | 10/2008 | Cusinato et al. |

FOREIGN PATENT DOCUMENTS

| | | |
|---|---|---|
| CN | 2044477 U | 9/1989 |
| CN | 2082947 U | 8/1991 |
| CN | 2385469 Y | 6/2000 |
| CN | 2777899 Y | 5/2006 |
| CN | 1832649 A | 9/2006 |
| CN | 101064475 A | 10/2007 |
| CN | 101511136 A | 8/2009 |
| CN | 101702854 A | 5/2010 |
| CN | 201585177 U | 9/2010 |
| EP | 2077609 A2 * | 7/2009 |
| JP | 61-124265 A | 6/1986 |
| KR | 20090018765 A | 2/2009 |
| WO | WO-2011/060700 A1 | 5/2011 |
| WO | WO-2011060701 | 5/2011 |

OTHER PUBLICATIONS

International Search Report (in Chinese with English translation) and Written Opinion (in Chinese) for PCT/CN2010/078716, mailed Feb. 24, 2011; ISA/CN.

International Search Report (in Chinese with English translation) and Written Opinion (in Chinese) for PCT/CN2010/078714, mailed Feb. 24, 2011; ISA/CN.

* cited by examiner

*Primary Examiner* — Jared Fureman
*Assistant Examiner* — Esayas Yeshaw
(74) *Attorney, Agent, or Firm* — Harness, Dickey & Pierce, P.L.C.

(57) ABSTRACT

A multi-path constant current driving circuit. In the multi-path constant current driving circuit, a current sharing transformer (T31, T32, T33, T3(n−1)) is provided in power supply circuits which are provided with adjacent rectifier and filter units (Z31, Z32, Z33, Z3n). A first winding of the current sharing transformer (T31, T32, T33, T3(n−1)) is connected between a first terminal of a secondary winding of a first power supply circuit and the rectifier and filter unit (Z31, Z32, Z33, Z3n) of the first power supply circuit. A second winding of the current sharing transformer (T31, T32, T33, T3(n−1)) is connected between a first terminal of a secondary winding of a second power supply circuit and the rectifier and filter unit (Z31, Z32, Z33, Z3n) of the second power supply circuit. In-phase current flows through the dotted terminal of the first winding and the synonym terminal of the second winding of the current sharing transformer (T31, T32, T33, T3(n−1)). The current sharing transformer (T31, T32, T33, T3(n−1)) is used for sharing the current between the power supply circuits which are provided with the adjacent rectifier and filter units (Z31, Z32, Z33, Z3n ). The driving circuit is provided with high current sharing efficiency, a small size and a low cost.

19 Claims, 36 Drawing Sheets

MULTI-PATH CONSTANT CURRENT DRIVING CIRCUIT

This application is a National Stage application of PCT international application PCT/CN2010/078716 filed on Nov. 15, 2010 and titled "MULTI-PATH CONSTANT CURRENT DRIVING CIRCUIT", which claims the benefit of Chinese patent application No. 200910225966.4 filed on Nov. 21, 2009, and claims the benefit of Chinese patent application No. 200920273352.9 filed with on Nov. 21, 2009. Both the PCT international application and the Chinese applications are incorporated herein by reference in their entireties.

FIELD OF THE INVENTION

The present invention relates to the field of constant-current driving technology, and in particular to a multipath constant-current driving circuit.

BACKGROUND OF THE INVENTION

Currently, the most common solution to constant-current control of multipath light-emitting diodes (LEDs) includes a constant-voltage module and multiple non-isolated DC/DC constant-current modules.

FIG. 1 shows a constant-current control circuit for multipath LEDs in the prior art. In this circuit, an input voltage Vac goes through a constant-voltage module and then inputs to multiple non-isolated DC/DC constant-current modules. Each of the non-isolated DC/DC constant-current modules performs constant-current control separately. However, there is normally a significant disparity between the voltage of the constant-voltage module and the voltage of an LED load; therefore none of the non-isolated DC/DC constant-current modules that follow the constant-voltage module has a high efficiency. In addition, the structure of multiple non-isolated DC/DC constant-current modules is complex and costly.

According to the Chinese patent application No. 200810085227.5, a balanced-current power supply circuit for multiple groups of LEDs is provided. As shown in FIG. 2, a first inductor Lca1 of a coupled inductor Lca is connected in series to a Direct current (DC) loop after the rectification by diodes D1 and D2, and a second inductor Lca2 of the coupled inductor Lca is connected in series to a DC loop after the rectification by diodes D3 and D4, so that the coupled inductor Lca can balance the two LED loads. However, according to the circuit shown in FIG. 2, each of the two coils of the coupled inductor Lca is connected in series to a DC loop, causing a DC current, but the magnetizing current in the coupled inductor is unidirectional; therefore when the voltages of the two load branches are not balanced, the difference between the currents of the two load branches is large, resulting in poor current balancing. Moreover, the presence of a DC current in the coupled inductor may cause saturation of the magnetic core, which requires air gaps to be created; therefore when the inductance is large, the size of the coupled inductor is large and hence costly.

SUMMARY OF THE INVENTION

In view of this, a technical problem to be solved by the present invention is to provide a multipath constant-current driving circuit, which provides good current balancing, and can reduce the size of the current-balancing transformer and lower the cost.

Therefore, the embodiments of the present invention provide the following technical solutions.

According to an embodiment of the present invention, it is provided a multipath constant-current driving circuit, including: a DC/AC converter, a main transformer and at least two rectification and filtering units, wherein the DC/AC converter is adapted to provide an alternating current (AC) voltage for a primary winding of the main transformer;

each of the at least two rectification and filtering units forms a power supply loop with a secondary winding of the main transformer; each of the power supply loops includes: a first terminal of the secondary winding connected to a first input terminal of a corresponding rectification and filtering unit, and a second terminal of the secondary winding connected to a second input terminal of the corresponding rectification and filtering unit; and a current-balancing transformer is arranged between power supply loops where adjacent rectification and filtering units are in; a first winding of the current-balancing transformer is arranged between a first terminal of a secondary winding and a rectification and filtering unit in a first power supply loop; a second winding of the current-balancing transformer is arranged between a first terminal of a secondary winding and a rectification and filtering unit in a second power supply loop; currents in the same direction flow through a dotted terminal of the first winding of the current-balancing transformer and a non-dotted terminal of the second winding of the current-balancing transformer, and the current-balancing transformer is for current balancing between the power supply loops where the adjacent rectification and filtering units are in.

The dotted terminal of the first winding of the current-balancing transformer is connected to the first terminal of the secondary winding in the first power supply loop, and a non-dotted terminal of the first winding of the current-balancing transformer is connected to a first input terminal of the rectification and filtering unit in the first power supply loop; and the non-dotted terminal of the second winding of the current-balancing transformer is connected to the first terminal of the secondary winding in the second power supply loop, and a dotted terminal of the second winding of the current-balancing transformer is connected to a first input terminal of the rectification and filtering unit in the second power supply loop.

The main transformer is:
a transformer including one primary winding and one secondary winding; or
a transformer including one primary winding and at least two secondary windings; or
a transformer including at least two primary windings and at least two secondary windings, where there is a one-to-one correspondence between the primary windings and the secondary windings.

The rectification and filtering unit includes a first diode, a second diode, a first capacitor and a second capacitor, wherein the first diode and the first capacitor are connected in series sequentially between a first input terminal and a second input terminal of the rectification and filtering unit; the second diode and the second capacitor are connected in series sequentially between the first input terminal and the second input terminal of the rectification and filtering unit; and an anode of the first diode is connected to the first input terminal of the rectification and filtering unit, a cathode of the second diode is connected to the first input terminal of the rectification and filtering unit.

The rectification and filtering unit includes a third diode, a fourth diode, a third capacitor and a fourth capacitor, wherein
the third capacitor, the third diode and the fourth capacitor are connected in series sequentially between a first input terminal and a second input terminal of the rectification and filtering unit; and a cathode of the fourth diode is connected to an anode of the third diode, an anode of the fourth diode is connected to the second input terminal of the rectification and filtering unit.

The rectification and filtering unit includes a fifth diode, a sixth diode, a first inductor, a second inductor and a fifth capacitor, wherein
the fifth diode and the sixth diode are connected in series sequentially between a first input terminal and a second input terminal of the rectification and filtering unit, and an anode of the fifth diode is connected to an anode of the sixth diode; the first inductor and the second inductor are connected in series sequentially between the first input terminal and the second input terminal of the rectification and filtering unit, and a first terminal of the fifth capacitor is connected to the anode of the fifth diode, a second terminal of the fifth capacitor is connected to a point where the first inductor is connected to the second inductor.

The rectification and filtering unit includes a seventh diode, a eighth diode, a ninth diode and a tenth diode, wherein
the seventh diode and the eighth diode are connected in series between a first input terminal and a second input terminal of the rectification and filtering unit, and a cathode of the seventh diode is connected to a cathode of the eighth diode; the ninth diode and the tenth diode are connected in series between the first input terminal and the second input terminal of the rectification and filtering unit, and an anode of the ninth diode is connected to an anode of the tenth diode.

The rectification and filtering unit includes an eleventh diode, a twelfth diode and a sixth capacitor, wherein
the eleventh diode and the twelfth diode are connected in series sequentially between a first input terminal and a second input terminal of the rectification and filtering unit, and an anode of the eleventh diode is connected to an anode of the twelfth diode; the sixth capacitor is connected in series between the first input terminal of the rectification and filtering unit and the anode of the twelfth diode.

The DC/AC converter is any one of a bridge circuit, a push-pull circuit, a flyback circuit, a forward circuit, a series resonant circuit, an LLC-type resonant circuit and a soft-switched circuit.

According to an embodiment of the present invention, it is also provided a multipath constant-current driving circuit, including: a DC/AC converter and a main transformer, wherein the multipath constant-current driving circuit further includes a power supply loop of at least two stages that corresponds to each secondary winding of the main transformer, and wherein
the DC/AC converter is adapted to provide an AC voltage for a primary winding of the main transformer;
each of the stages of a power supply loop that corresponds to a secondary winding of the main transformer includes: a first terminal of the secondary winding connected to a second terminal of the secondary winding via second windings of all current-balancing transformers arranged in previous stages of the power supply loop, a first winding of a current-balancing transformer corresponding to both the current stage of the power supply loop and the next stage of the power supply loop, and a rectification and filtering unit in the current stage of the power supply loop sequentially; and
currents in the same direction flow through a dotted terminal of a first winding and a non-dotted terminal of a second winding of each of the current-balancing transformers, and the current-balancing transformer is for current balancing between two adjacent power supply loops.

The rectification and filtering unit includes a first diode, a second diode, a first capacitor and a second capacitor, wherein
the first diode and the first capacitor are connected in series sequentially between a first input terminal and a second input terminal of the rectification and filtering unit; the second diode and the second capacitor are connected in series sequentially between the first input terminal and the second input terminal of the rectification and filtering unit; and an anode of the first diode is connected to the first input terminal of the rectification and filtering unit, a cathode of the second diode is connected to the first input terminal of the rectification and filtering unit.

The rectification and filtering unit includes a third diode, a fourth diode, a third capacitor and a fourth capacitor, wherein
the third capacitor, the third diode and the fourth capacitor are connected in series sequentially between a first input terminal and a second input terminal of the rectification and filtering unit; and a cathode of the fourth diode is connected to an anode of the third diode, an anode of the fourth diode is connected to the second input terminal of the rectification and filtering unit.

The rectification and filtering unit includes a fifth diode, a sixth diode, a first inductor, a second inductor and a fifth capacitor, wherein
the fifth diode and the sixth diode are connected in series sequentially between a first input terminal and a second input terminal of the rectification and filtering unit, and an anode of the fifth diode is connected to an anode of the sixth diode; the first inductor and the second inductor are connected in series sequentially between the first input terminal and the second input terminal of the rectification and filtering unit, and a first terminal of the fifth capacitor is connected to the anode of the fifth diode, a second terminal of the fifth capacitor is connected to a point where the first inductor is connected to the second inductor.

The rectification and filtering unit includes a seventh diode, a eighth diode, a ninth diode and a tenth diode, wherein
the seventh diode and the eighth diode are connected in series between a first input terminal and a second input terminal of the rectification and filtering unit, and a cathode of the seventh diode is connected to a cathode of the eighth diode; the ninth diode and the tenth diode are connected in series between the first input terminal and the second input terminal of the rectification and filtering unit, and an anode of the ninth diode is connected to an anode of the tenth diode.

The rectification and filtering unit includes an eleventh diode, a twelfth diode and a sixth capacitor, wherein
the eleventh diode and the twelfth diode are connected in series sequentially between a first input terminal and a second input terminal of the rectification and filtering unit, and an anode of the eleventh diode is connected to an anode of the twelfth diode; the sixth capacitor is connected in series between the first input terminal of the rectification and filtering unit and the anode of the twelfth diode.

The main transformer is:
a transformer including one primary winding and one secondary winding; or
a transformer including one primary winding and at least two secondary windings; or
a transformer including at least two primary windings and at least two secondary windings, where there is a one-to-one correspondence between the primary windings and the secondary windings.

The DC/AC converter is any one of a bridge circuit, a push-pull circuit, a flyback circuit, a forward circuit, a series resonant circuit, an LLC-type resonant circuit and a soft-switched circuit.

According to an embodiment of the present invention, it is also provided a multipath constant-current driving circuit, including: a DC/AC converter, a main transformer and at least two power supply branch groups, wherein
the DC/AC converter is adapted to provide an AC voltage for a primary winding of the main transformer;
the main transformer includes at least one secondary winding;
each of the power supply branch groups forms a main power supply loop with the secondary winding of the main transformer; and
a current-balancing transformer is arranged between two adjacent main power supply loops; a first winding of the current-balancing transformer is arranged in one of the two main power supply loops, and a second winding of the current-balancing transformer is arranged in the other one of the two main power supply loops, for current balancing between the two main power supply loops.

At least one of the at least two main power supply loops includes:
at least two power supply loops each of which is formed by a rectification and filtering unit and a corresponding secondary winding, and each of the power supply loops includes: a first terminal of a secondary winding of the main transformer connected to a first input terminal of a corresponding rectification and filtering unit, and a second terminal of the secondary winding connected to a second input terminal of the corresponding rectification and filtering unit; and, a current-balancing transformer is arranged between power supply loops where two adjacent rectification and filtering units are in, a first winding of the current-balancing transformer is arranged between a first terminal of a secondary winding and a rectification and filtering unit in a first power supply loop, a second winding of the current-balancing transformer is arranged between a first terminal of a secondary winding and a rectification and filtering unit in a second power supply loop; currents in the same direction flow through a dotted terminal of the first winding of the current-balancing transformer and a non-dotted terminal of the second winding of the current-balancing transformer, and the current-balancing transformer is for current balancing between the power supply loops where the adjacent rectification and filtering units are in.

At least one of the at least two main power supply loops includes:
a power supply loop of at least two stages, and each of the stages of the power supply loops includes: a first terminal of a corresponding secondary winding of the main transformer connected to a second terminal of the secondary winding via second windings of all current-balancing transformers arranged in previous stages of the power supply loop, a first winding of a current-balancing transformer corresponding to both the current stage of the power supply loop and the next stage of the power supply loop, and a rectification and filtering unit in the current stage of the power supply loop sequentially; currents in the same direction flow through a dotted terminal of a first winding and a non-dotted terminal of a second winding of each of the current-balancing transformers, and the current-balancing transformer is for current balancing between two adjacent power supply loops.

Technical effects of the technical solutions above are discussed below.

In a multipath constant-current driving circuit as described above, each of the first winding and the second winding of the current-balancing transformer is connected in series in an AC power supply loop; hence there is no DC current. Therefore, even if the difference between the voltages across respective loads is large, good current balancing can be provided. Moreover, the current-balancing transformer dose not need to be provided with air gaps, therefore the transformer can be made at a small size, which further lowers the cost.

DETAILED DESCRIPTION OF THE INVENTION

Figure 1:
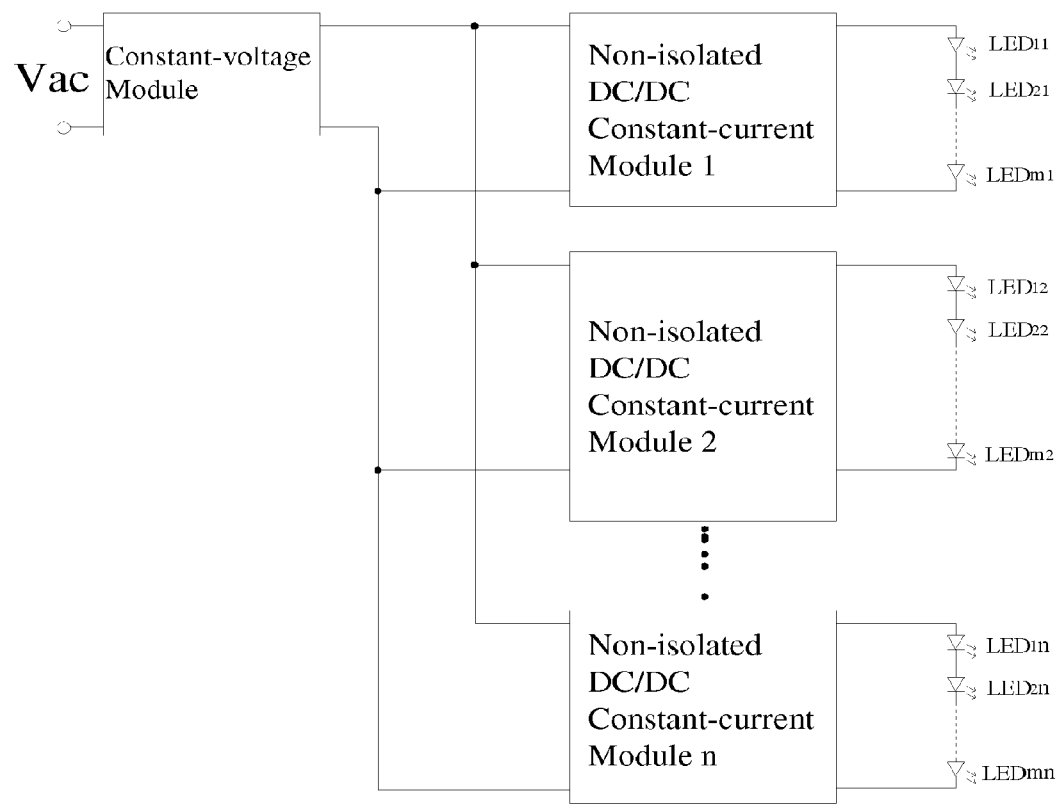
FIG. 1 is a structural diagram illustrating an LED constant-current control circuit in the prior art.
Figure 2:
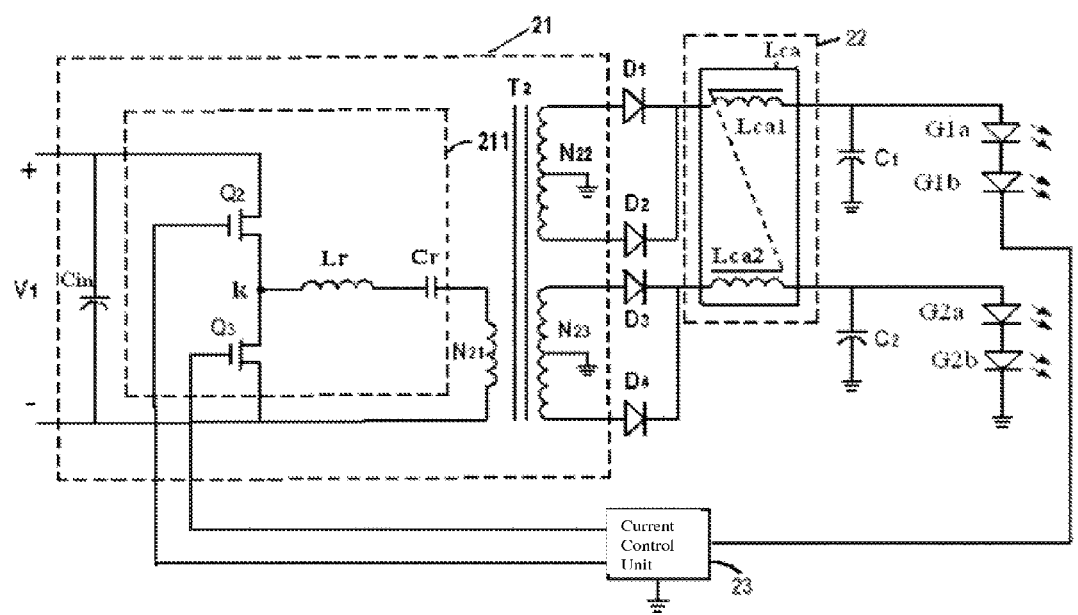
FIG. 2 illustrates a balanced-current power supply circuit for multiple groups of LEDs in the prior art.

At first, the operating principle of a current-balancing transformer is described below.

Assuming the currents required by loads A1 and A2 have $I1:I2=1:1$, the turns ratio of the current-balancing transformer for current balancing between the loads A1 and A2 is $W1:W2=1:1$.

If the voltage Uo1 across the load A1 and the voltage Uo2 across the load A2 are not equal, the currents I1 and I2 that flow through respective loads are not equal, and the currents iw1 and iw2 that flow through respective windings of the current-balancing transformer are not equal; hence the magnetizing current in the current-balancing transformer is not zero. The magnetizing current generates an AC voltage across the current-balancing transformer, which automatically balances the difference between the voltages Uo1 and Uo2 across respective loads, making the currents iw1 and iw2 in respective windings of the current-balancing transformer equal and the load currents I1 and I2 equal.

Assuming the currents required by the loads A1 and A2 have I1:I2=m:n, the turns ratio of the current-balancing transformer for current balancing between the loads A1 and A2 is W1:W2=n:m, then, if the ratio between the currents iw1 and iw2 that flow through respective windings of the current-balancing transformer is not m:n, the magnetizing current in the current-balancing transformer is not zero. The magnetizing current generates an AC voltage across the current-balancing transformer, which automatically balances the difference between the voltages across respective loads, balancing the ratio between the currents I1 and I2 in respective windings of the current-balancing transformer into m:n, and realizing balancing between the load currents.

Implementation of the multipath constant-current driving circuits according to the embodiments of the present invention will be described hereinafter in conjunction with the accompanying drawings.

A multipath constant-current driving circuit according to an embodiment of the present invention includes: a DC/AC converter, a main transformer and at least two rectification and filtering units.

The DC/AC converter is adapted to provide an AC voltage for a primary winding of the main transformer.

Each of the at least two rectification and filtering units forms a power supply loop with a secondary winding of the main transformer. Each of the power supply loops includes: a first terminal of the secondary winding connected to a first input terminal of a corresponding rectification and filtering unit, and a second terminal of the secondary winding connected to a second input terminal of the corresponding rectification and filtering unit.

A current-balancing transformer is arranged between power supply loops where adjacent rectification and filtering units are in. A first winding of the current-balancing transformer is arranged between a first terminal of a secondary winding and a rectification and filtering unit in a first power supply loop; a second winding of the current-balancing transformer is arranged between a first terminal of a secondary winding and a rectification and filtering unit in a second power supply loop. Currents in the same direction flow through a dotted terminal of the first winding of the current-balancing transformer and a non-dotted terminal of the second winding of the current-balancing transformer, and the current-balancing transformer is for current balancing between the power supply loops where the adjacent rectification and filtering units are in.

The DC/AC converter may be any one of a bridge circuit, a push-pull circuit, a flyback circuit, a forward circuit, a series resonant circuit, an LLC-type resonant circuit and a soft-switched circuit.

The main transformer may be: a transformer including one primary winding and one secondary winding; or a transformer including one primary winding and at least two secondary windings; or a transformer including at least two primary windings and at least two secondary windings; or the like.

The rectification and filtering unit is not limited to a specific implementation.

The multipath constant-current driving circuit above supplies electric power to a load, e.g., an LED load, via a power supply loop.

Figure 5:
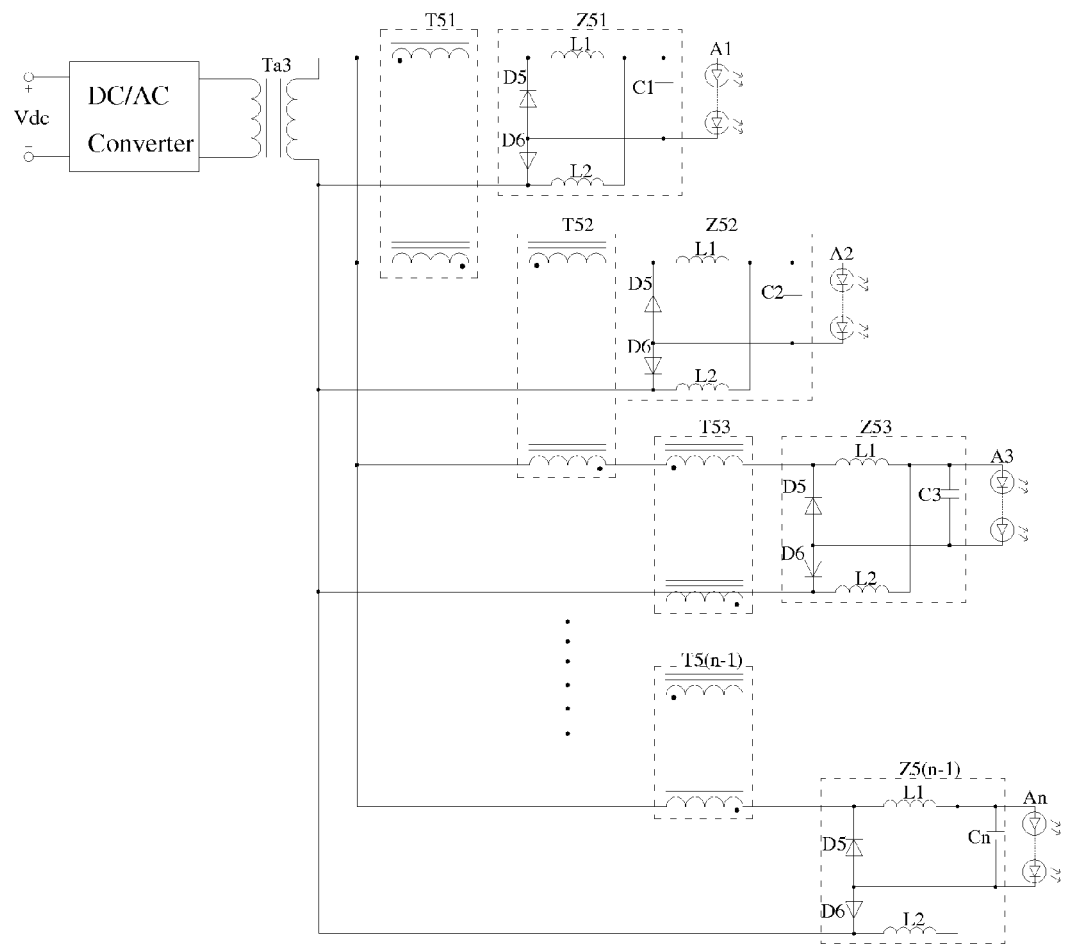
FIGS. 5 and 5a are structural diagrams illustrating a third multipath constant-current driving circuit according to the present invention.

In a multipath constant-current driving circuit above, e.g., the multipath constant-current driving circuit shown in FIG. 5, in comparison with the prior art, each of the first winding and the second winding of the current-balancing transformer is connected in series in an AC power supply loop; hence there is no DC current. Therefore, even if the difference between the voltages across respective loads is large, good current balancing can be provided. Moreover, the current-balancing transformer dose not need to be provided with air gaps, therefore the transformer can be made at a small size, which further lowers the cost.

Implementation of the multipath constant-current driving circuits according to the embodiments of the present invention will be described hereinafter in detail in conjunction with FIGS. 3 to 9e.

Figure 3:
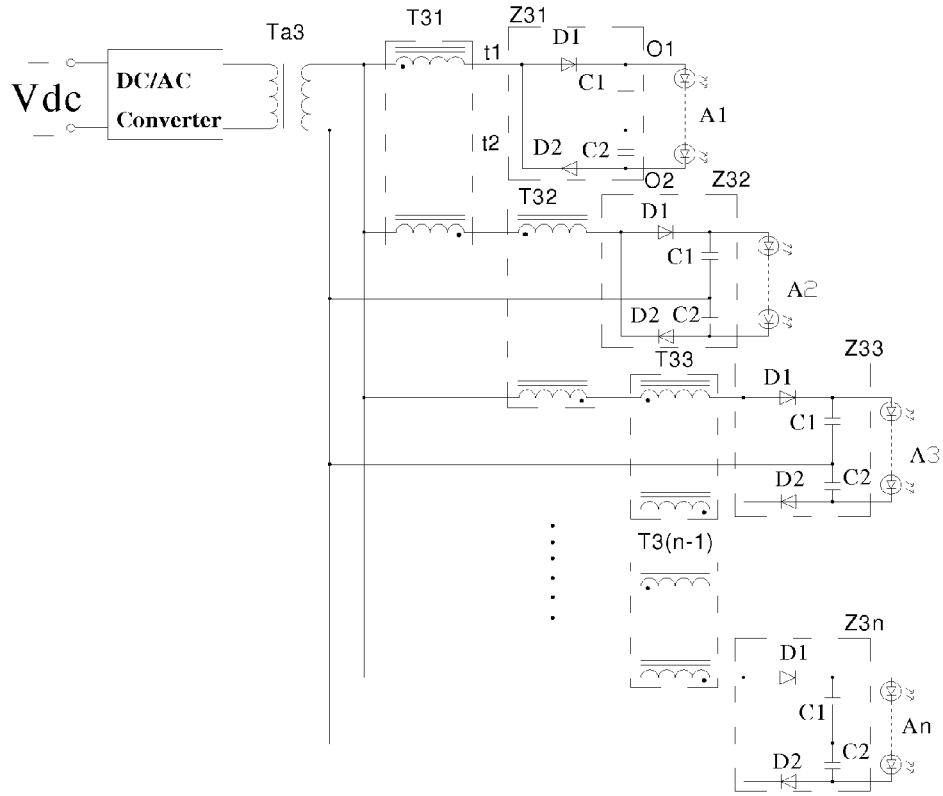
FIGS. 3 and 3a are structural diagrams illustrating a multipath constant-current driving circuit according to the present invention.

FIG. 3 is an implementation structure of a multipath constant-current driving circuit according to an embodiment of the present invention. As shown in FIG. 3, the driving circuit includes: a DC/AC converter, a main transformer Ta3, n−1 current-balancing transformers T31 to T3(n−1), n rectification and filtering units Z31 to Z3n, and n load branches A31 to A3n.

Specifically, the main transformer Ta1 includes one primary winding and one secondary winding. The primary winding is connected to the output terminal of the DC/AC converter, to receive an AC voltage output by the DC/AC converter.

A first terminal of the secondary winding of the main transformer is connected to a first input terminal t1 of each rectification and filtering unit, and a second terminal of the secondary winding of the main transformer is connected to a second input terminal t2 of each rectification and filtering unit, so that the secondary winding forms a power supply loop with each rectification and filtering unit.

A current-balancing transformer is arranged between power supply loops where two adjacent rectification and filtering units are in. For example, a current-balancing transformer T31 is arranged between the rectification and filtering unit Z31 and the rectification and filtering unit Z32. The dotted terminal of a first winding of the current-balancing transformer T31 is connected to the first terminal of the secondary winding, the non-dotted terminal of the first winding of the current-balancing transformer T31 is connected to a first input terminal t1 of the rectification and filtering unit Z31. The non-dotted terminal of a second winding of the current-balancing transformer T31 is connected to the first terminal of the secondary winding, the dotted terminal of the second winding of the current-balancing transformer T31 is connected to the first input terminal t1 of the rectification and filtering unit Z32. Then, currents in the same direction flow through the dotted terminal of the first winding and the non-dotted terminal of the second winding of the current-balancing transformer T31; and currents in opposite directions flow through the dotted terminal of the first winding and the dotted terminal of the second winding of the current-balancing transformer T31, thereby realizing current balancing between the two power supply loops where the rectification and filtering unit Z31 and the rectification and filtering unit Z32 are in.

In FIG. 3, each rectification and filtering unit includes: a first diode D1, a second diode D2, a first capacitor C1 and a second capacitor C2. Specifically, the first diode D1 and the first capacitor C1 are connected in series sequentially between the first input terminal t1 and the second input terminal t2 of the rectification and filtering unit; the second diode D2 and the second capacitor C2 are connected in series sequentially between the first input terminal t1 and the second input terminal t2 of the rectification and filtering unit. The anode of the first diode D1 is connected to the first input terminal t1, and the cathode of the second diode D2 is connected to the first input terminal t1. In the rectification and filtering unit, the cathode of the first diode D1 and the anode of the second diode D2 are used as the first output terminal O1 and the second output terminal O2 of the rectification and filtering unit respectively, each of which is connected to a corresponding load branch and supplies electric power to the corresponding load branch.

Figure 3A:
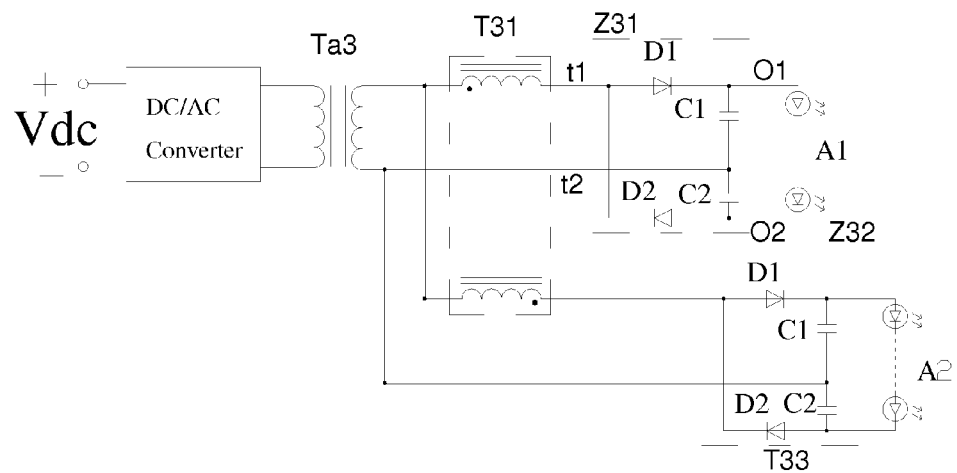

As shown in FIG. 3a, the minimum number of branches of the multipath constant-current driving circuit above may be 2. In this case, the multipath constant-current driving circuit shown in FIG. 3 has a structure shown in FIG. 3a, including only two rectification and filtering units and two load branches. The detailed connections are similar to FIG. 3, which are therefore omitted here.

Figure 4:
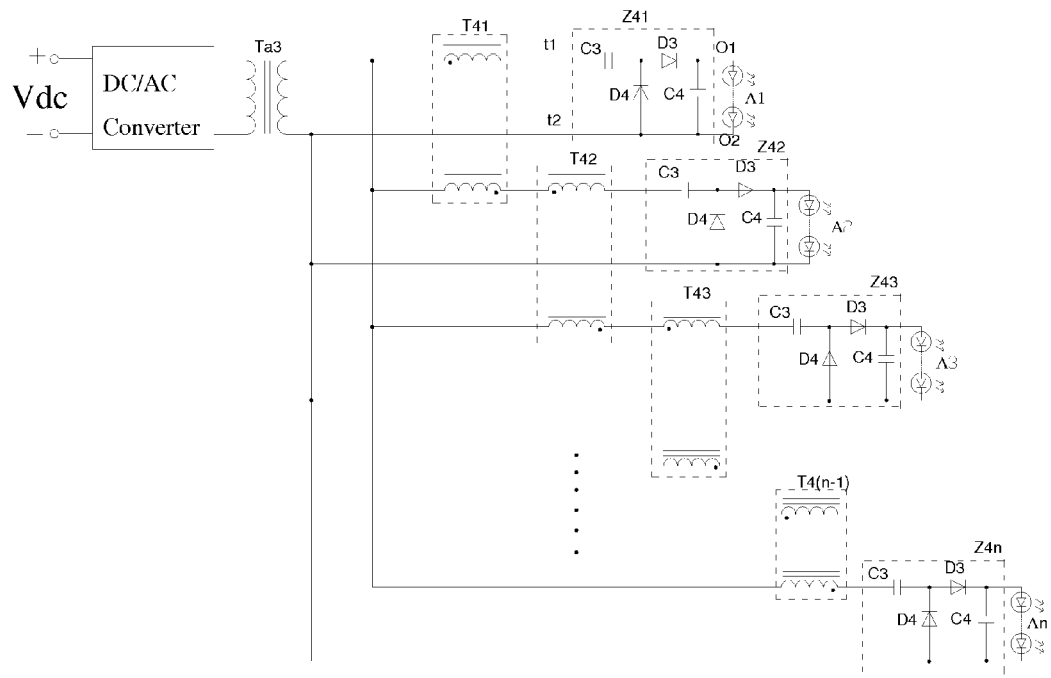
FIGS. 4 and 4a are structural diagrams illustrating a second multipath constant-current driving circuit according to the present invention.

Furthermore, the rectification and filtering unit shown in FIG. 3 may be implemented with another structure, for example, in a multipath constant-current driving circuit shown in FIG. 4, most components have a structure the same as FIG. 3, except for the rectification and filtering unit, which includes: a third diode D3, a fourth diode D4, a third capacitor C3 and a fourth capacitor C4. Specifically, the third capacitor C3, the third diode D3 and the fourth capacitor C4 are connected in series sequentially between the first input terminal t1 and the second input terminal t2 of the rectification and filtering unit. The cathode of the fourth diode D4 is connected to the anode of the third diode D3, and the anode of the fourth diode D4 is connected to the second input terminal t2 of the rectification and filtering unit. In the rectification and filtering unit, the cathode of the third diode D3 and the anode of the fourth diode D4 are used as the first output terminal O1 and the second output terminal O2 of the rectification and filtering unit respectively, each of which is connected to a corresponding load branch and supplies electric power to the corresponding load branch.

Figure 4A:
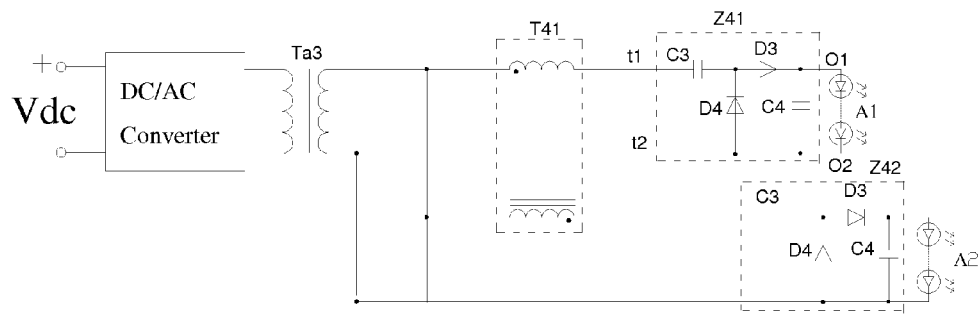

When the number of branches in the multipath constant-current driving circuit shown in FIG. 4 is 2, the multipath constant-current driving circuit may have a structure shown in FIG. 4a, which is omitted here in the interest of clarity.

Alternatively, in a multipath constant-current driving circuit shown in FIG. 5, most components have a structure the same as FIG. 3, except for the rectification and filtering unit, which includes: a fifth diode D5, a sixth diode D6, a first inductor L1, a second inductor L2 and a fifth capacitor C5. Specifically, the fifth diode D5 and the sixth diode D6 are connected in series sequentially between the first input terminal t1 and the second input terminal t2 of the rectification and filtering unit, and the anode of the fifth diode D5 is connected to the anode of the sixth diode D6. The first inductor L1 and the second inductor L2 are connected in series sequentially between the first input terminal t1 and the second input terminal t2 of the rectification and filtering unit. The first terminal of the fifth capacitor C5 is connected to the anode of the fifth diode D5, and the second terminal of the fifth capacitor C5 is connected to the point where the first inductor L1 is connected to the second inductor L2. In the rectification and filtering unit, the anode of the fifth diode D5 and the point where the first inductor L1 is connected to the second inductor L2 are used as the first output terminal O1 and the second output terminal O2 of the rectification and filtering unit respectively, each of which is connected to a corresponding load branch and supplies electric power to the corresponding load branch.

Figure 5A:
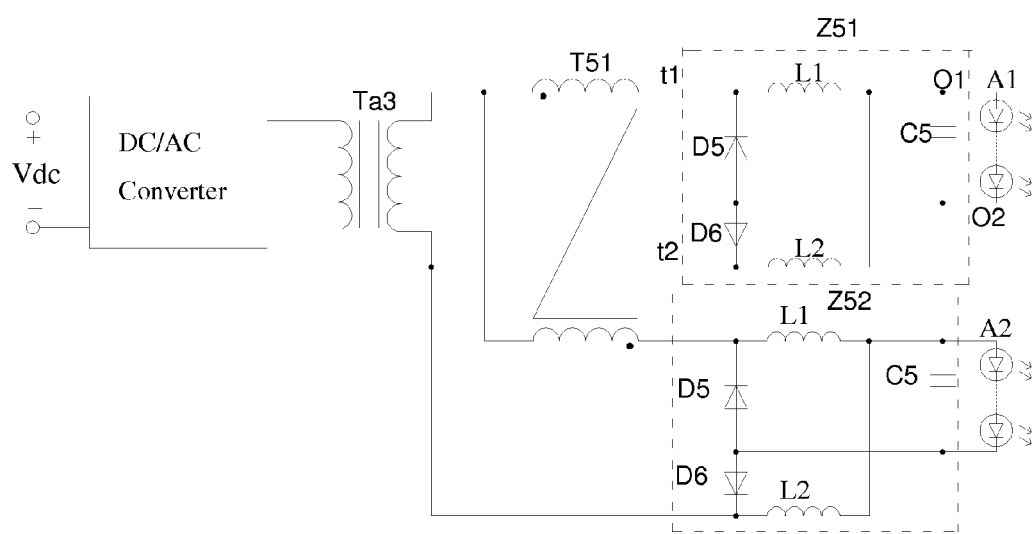

When the number of branches in the multipath constant-current driving circuit shown in FIG. 5 is 2, the multipath constant-current driving circuit may have a structure shown in FIG. 5a, which is omitted here in the interest of clarity.

Figure 6:
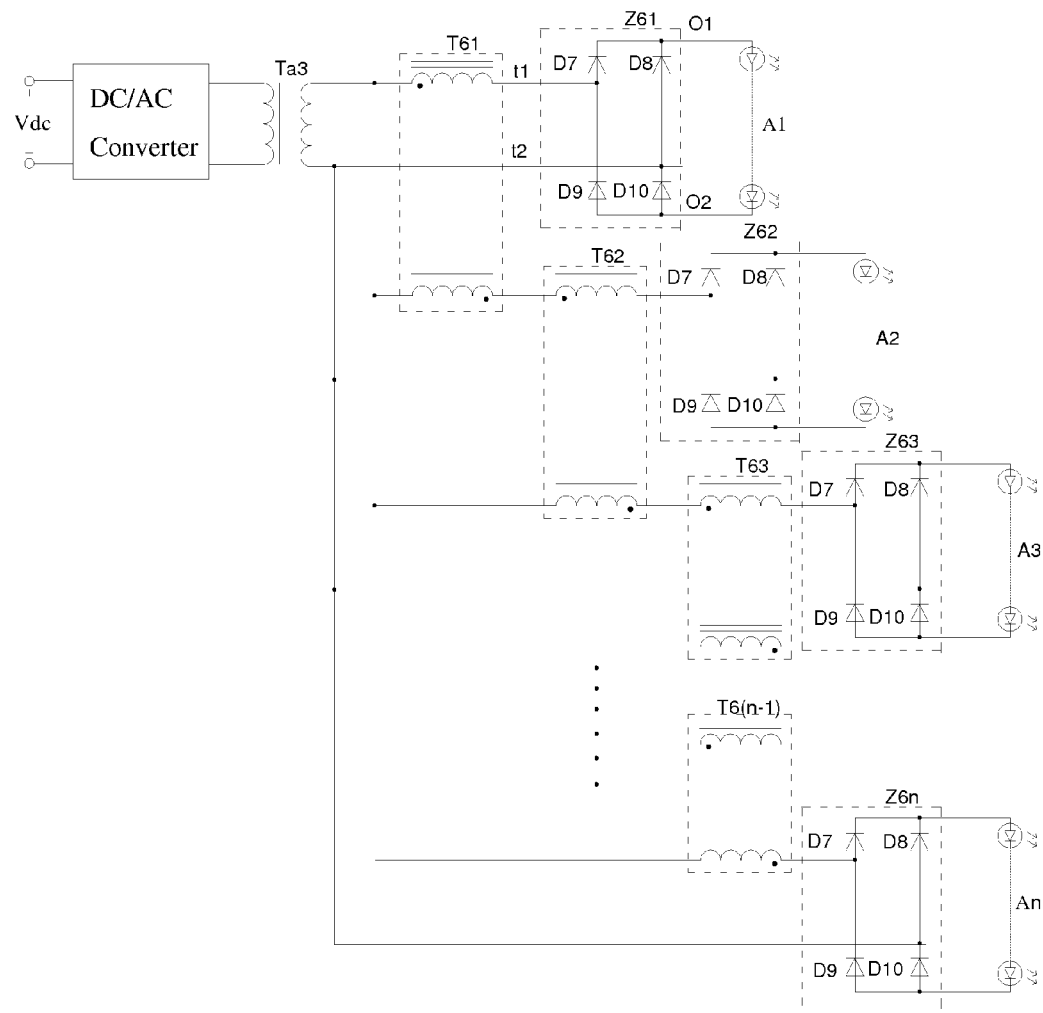
FIGS. 6a and 6a are structural diagrams illustrating a fourth multipath constant-current driving circuit according to the present invention.

Alternatively, in a multipath constant-current driving circuit shown in FIG. 6, most components have a structure the same as FIG. 3, except for the rectification and filtering unit, which includes: a seventh diode D7, a eighth diode D8, a ninth diode D9 and a tenth diode D10. Specifically, the seventh diode D7 and the eighth diode D8 are connected in series between the first input terminal t1 and the second input terminal t2 of the rectification and filtering unit, and the cathode of the seventh diode D7 is connected to the cathode of the eighth diode D8. The ninth diode D9 and the tenth diode D10 are connected in series between the first input terminal t1 and the second input terminal t2 of the rectification and filtering unit, and the anode of the ninth diode D9 is connected to the anode of the tenth diode D10. In the rectification and filtering unit, the cathode of the seventh diode D7 and the anode of the ninth diode D9 are used as the first output terminal O1 and the second output terminal O2 of the rectification and filtering unit respectively, each of which is connected to a corresponding load branch and supplies electric power to the corresponding load branch.

Figure 6A:
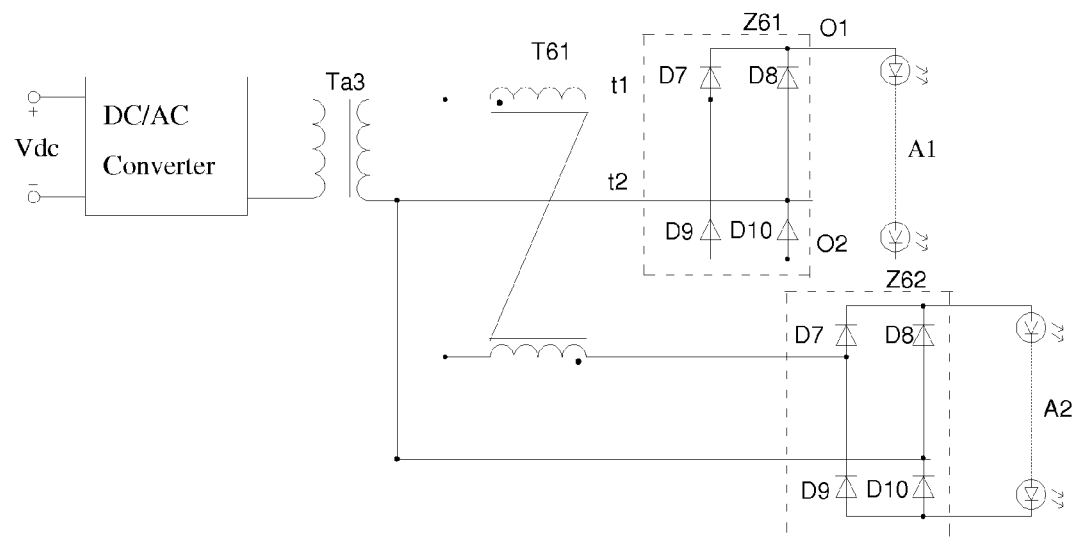

When the number of branches in the multipath constant-current driving circuit shown in FIG. 6 is 2, the multipath constant-current driving circuit may have a structure shown in FIG. 6a, which is omitted here in the interest of clarity.

Figure 7:
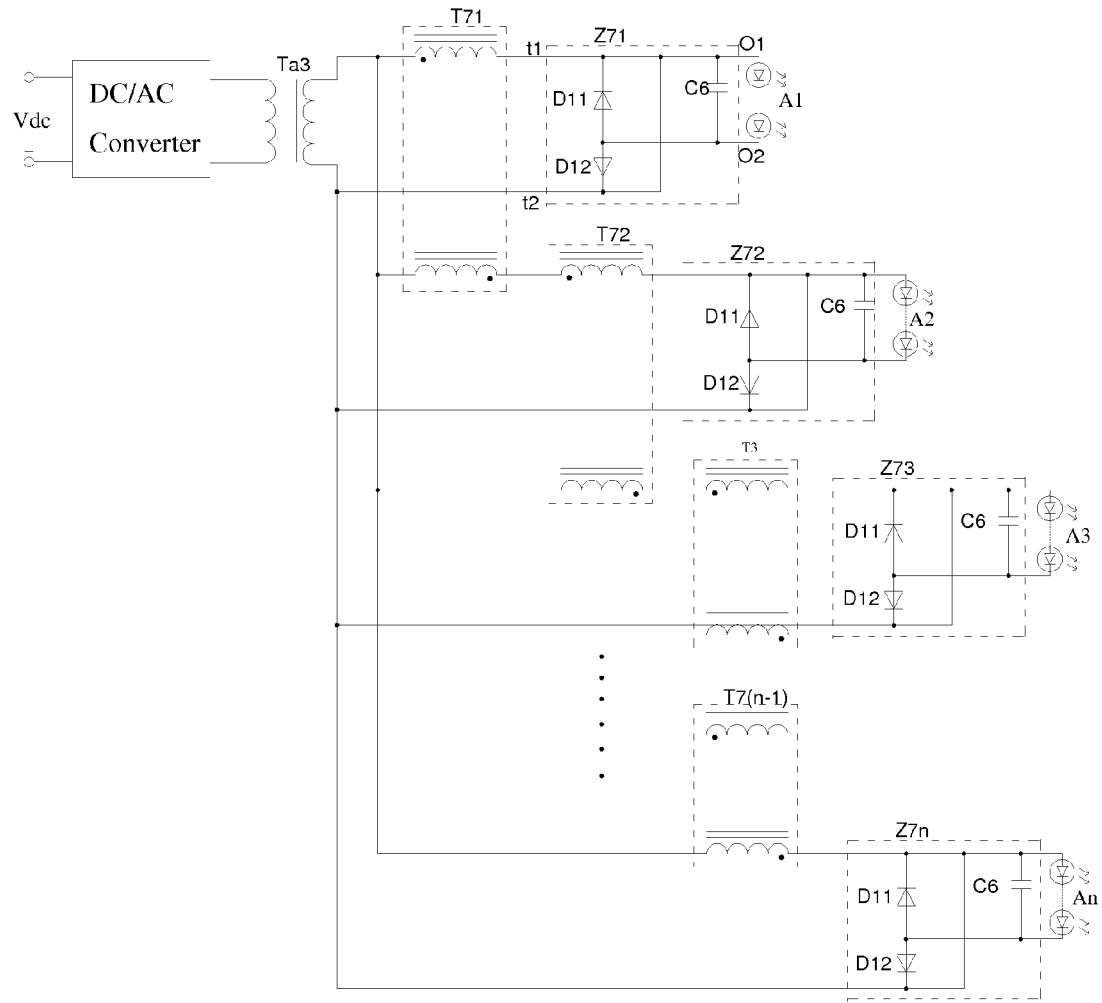
FIGS. 7 and 7a are structural diagrams illustrating a fifth multipath constant-current driving circuit according to the present invention.

Alternatively, in a multipath constant-current driving circuit shown in FIG. 7, most components have a structure the same as FIG. 3, except for the rectification and filtering unit, which includes: a eleventh diode D11, a twelfth diode D12 and a sixth capacitor C6. Specifically, the eleventh diode D11 and the twelfth diode D12 are connected in series sequentially between the first input terminal t1 and the second input terminal t2 of the rectification and filtering unit, and the anode of the eleventh diode D11 is connected to the anode of the twelfth diode D12. The sixth capacitor C6 is connected in series between the first input terminal t1 of the rectification and filtering unit and the anode of the twelfth diode D12. In the rectification and filtering unit, the cathode of the eleventh diode D11 and the anode of the eleventh diode D11 are used as the first output terminal O1 and the second output terminal O2 of the rectification and filtering unit respectively, each of which is connected to a corresponding load branch and supplies electric power to the corresponding load branch.

Figure 7A:
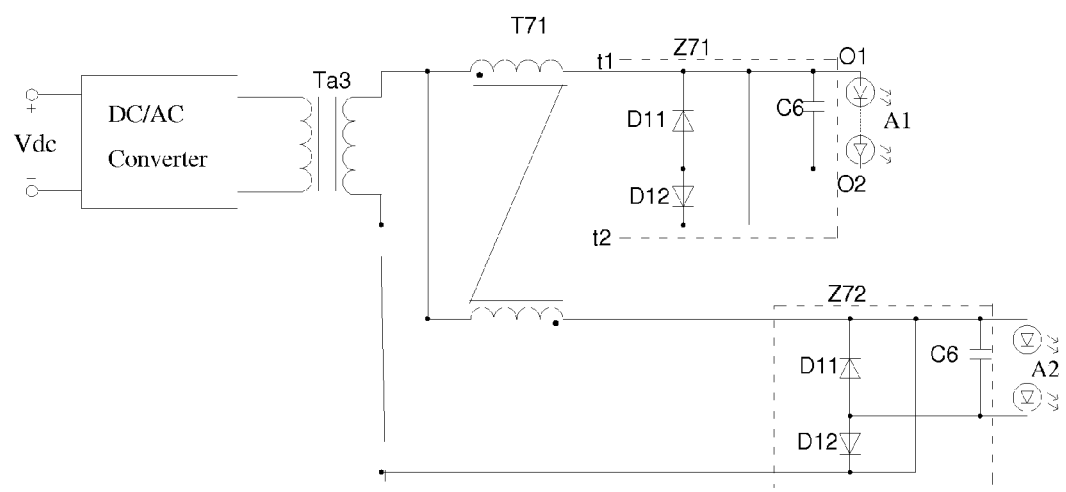
Figure 8A:
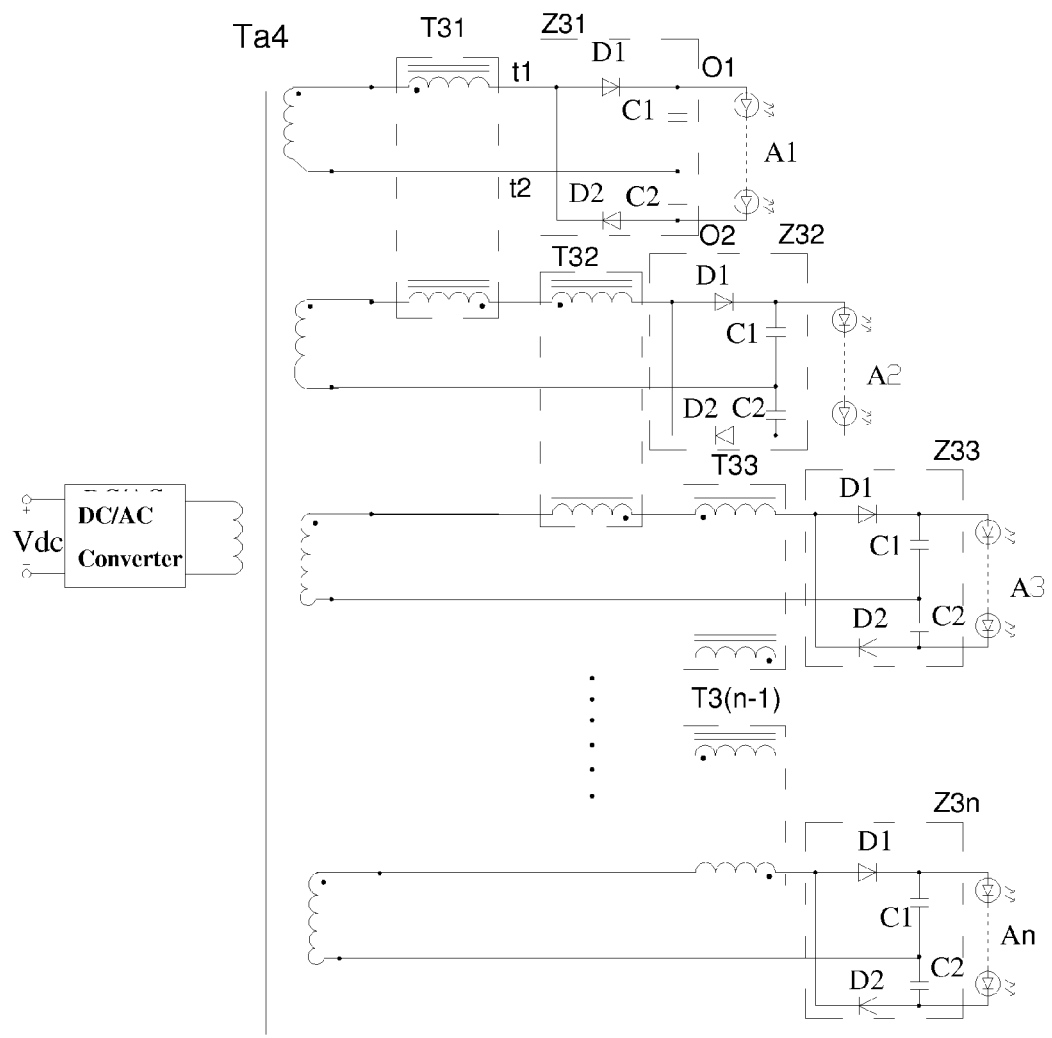
FIGS. 8a to 9e are structural diagrams illustrating a multipath constant-current driving circuit according to the present invention with different main transformer structures.
Figure 8B:
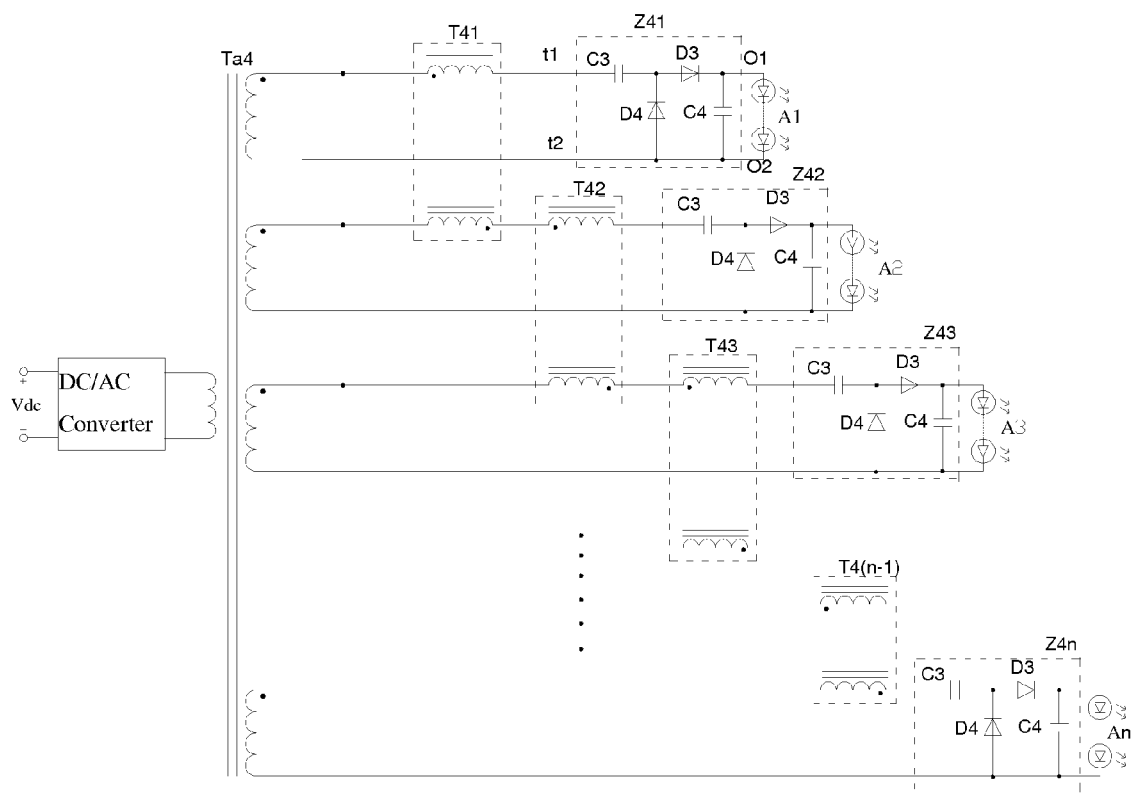
Figure 8C:
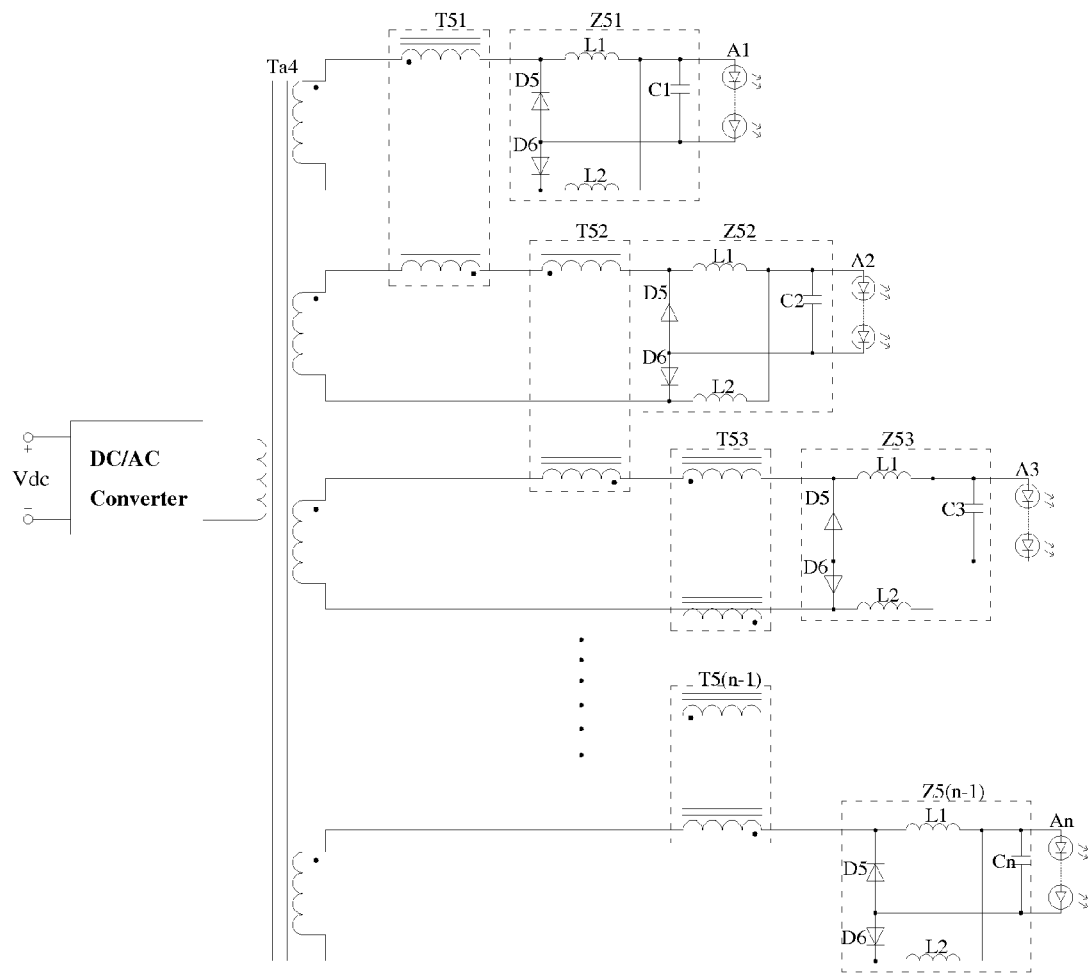
Figure 8D:
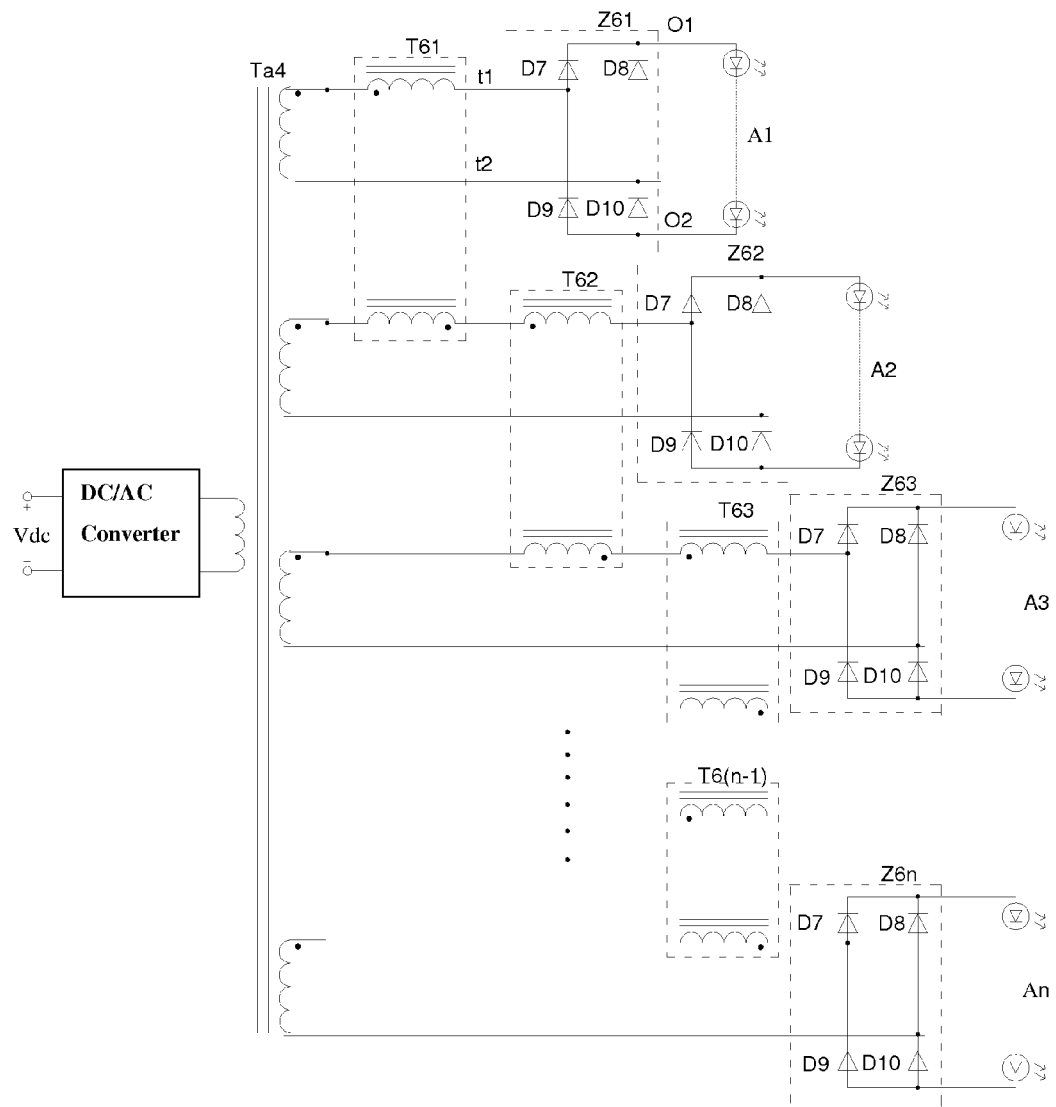
Figure 8E:
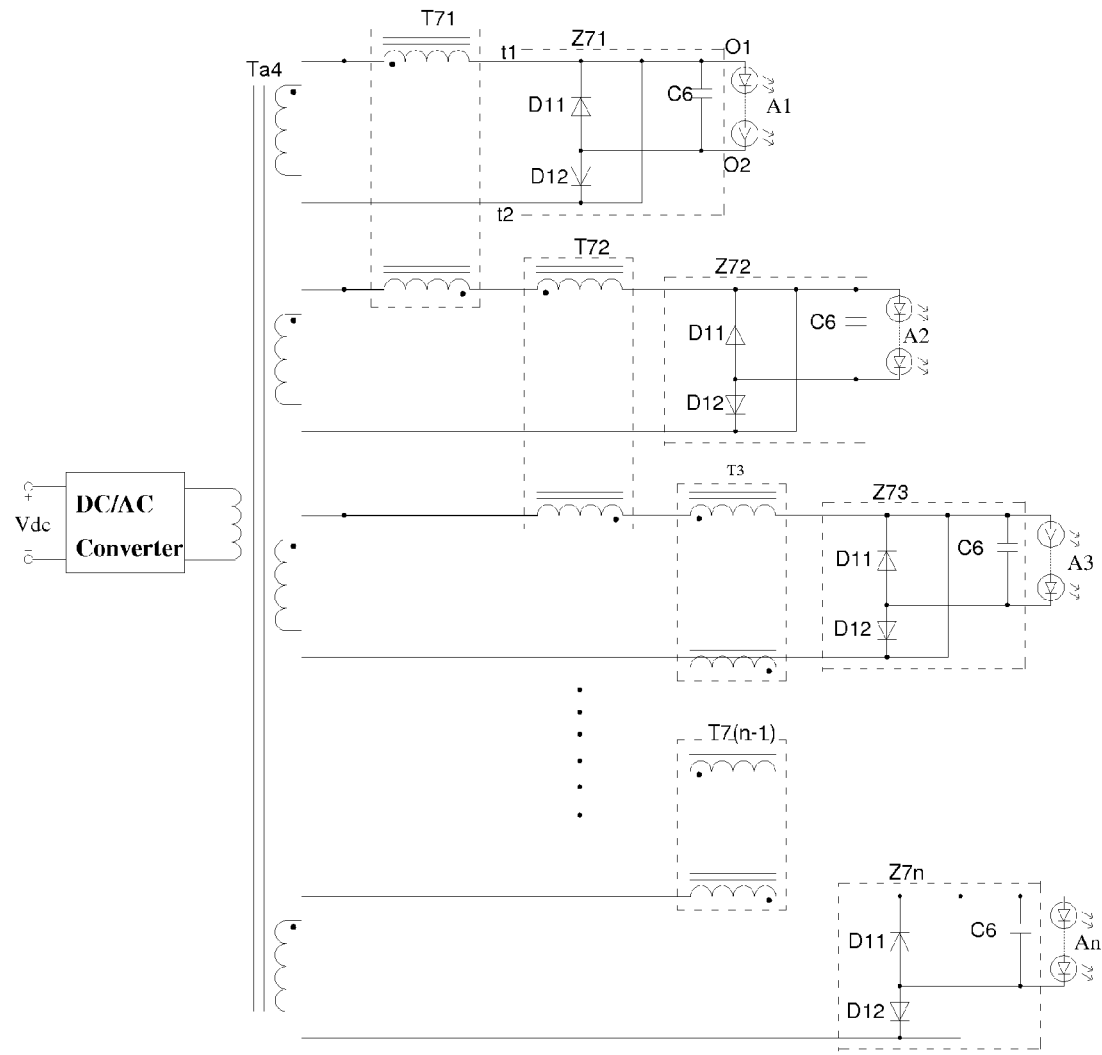
Figure 9A:
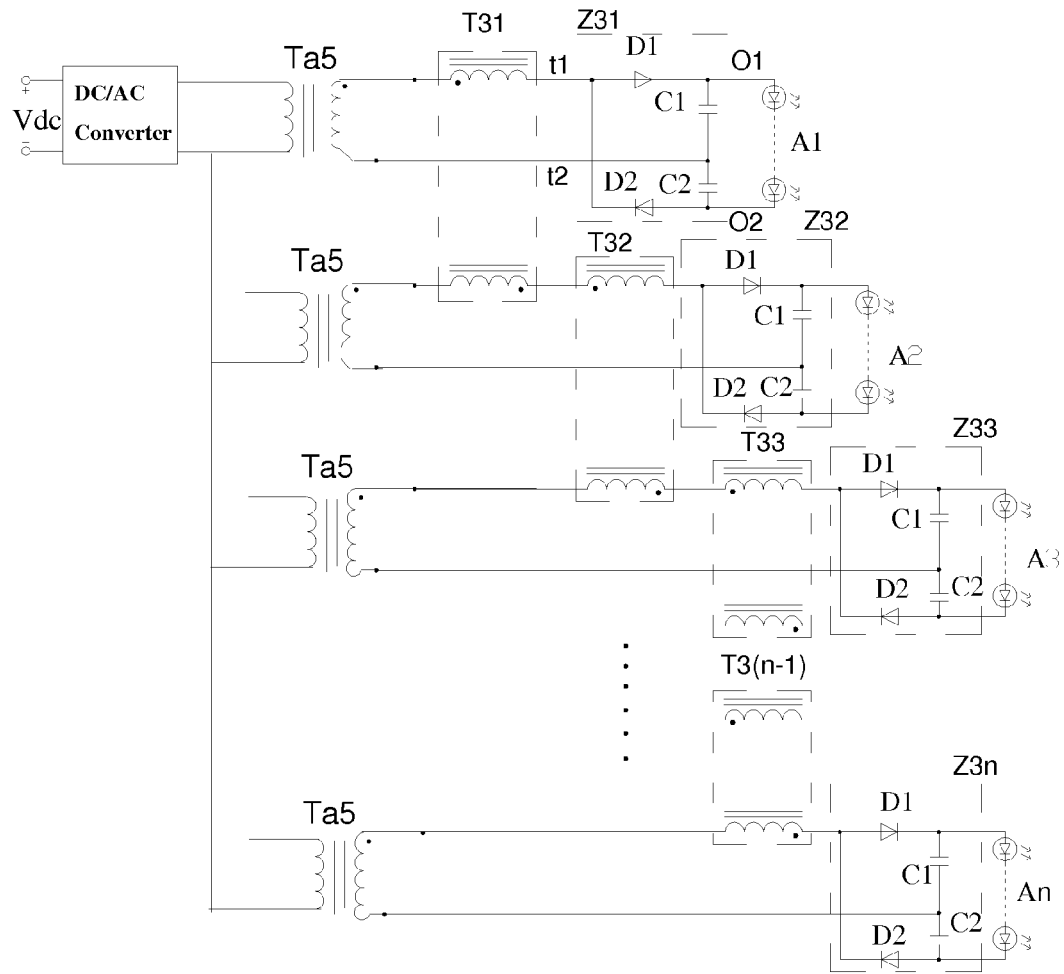
Figure 9B:
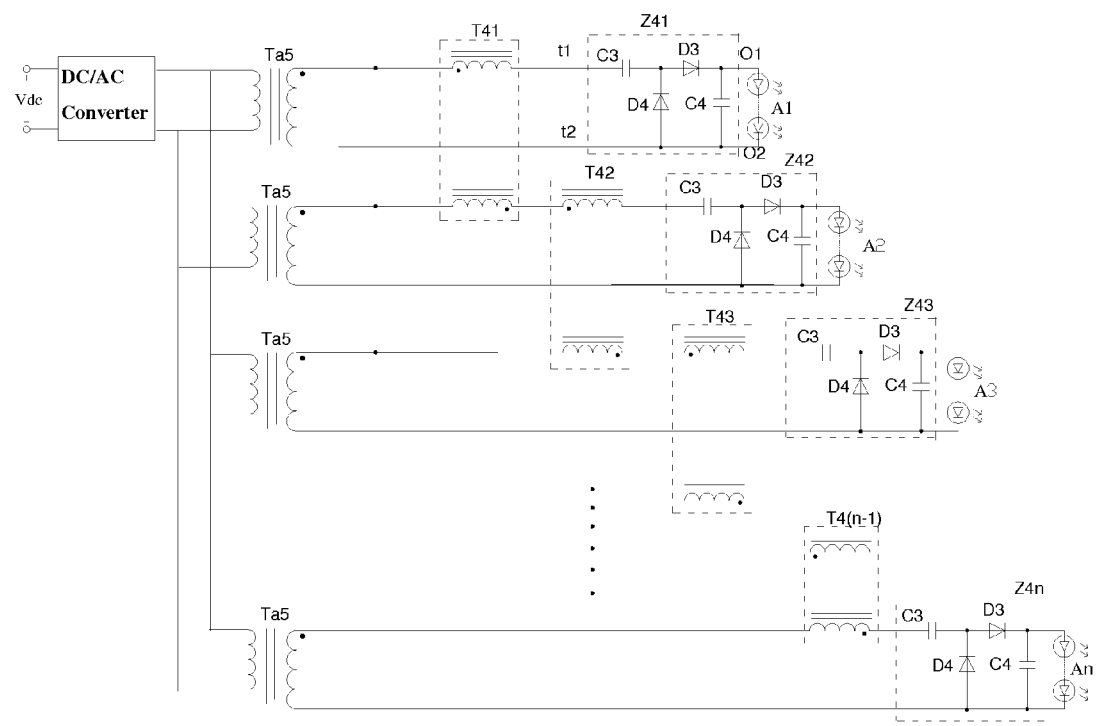
Figure 9C:
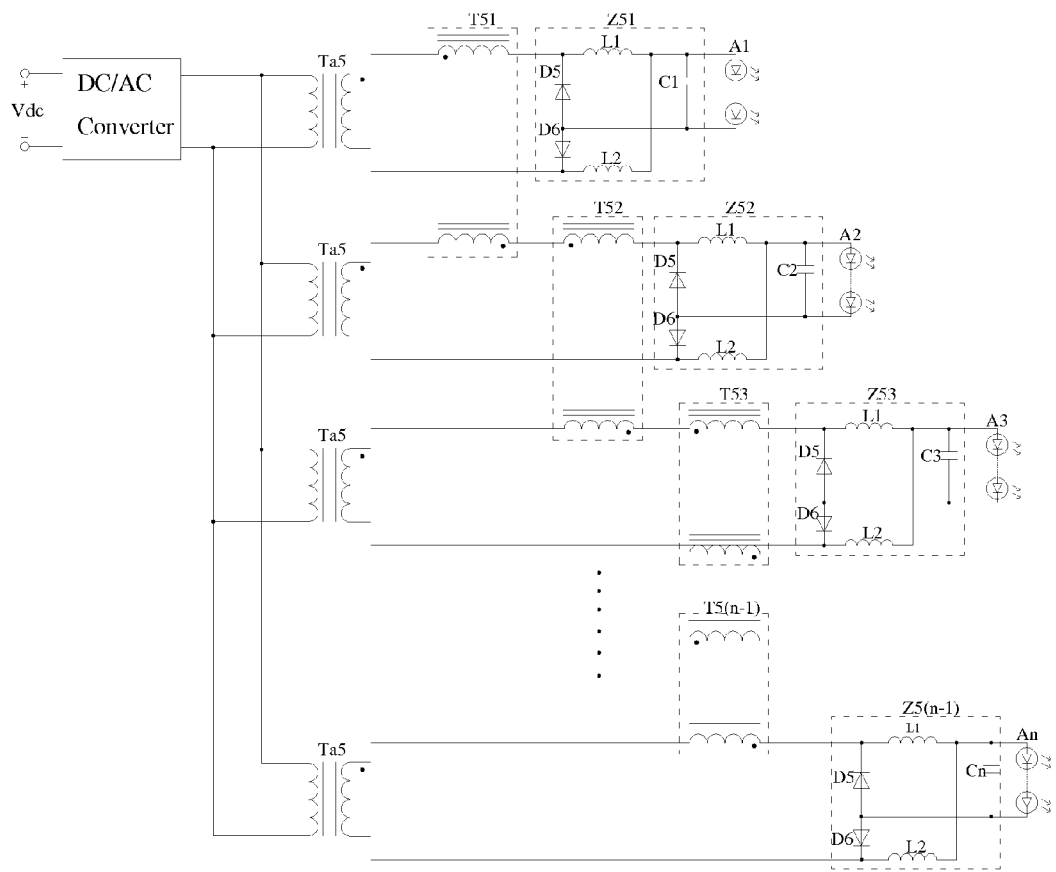
Figure 9D:
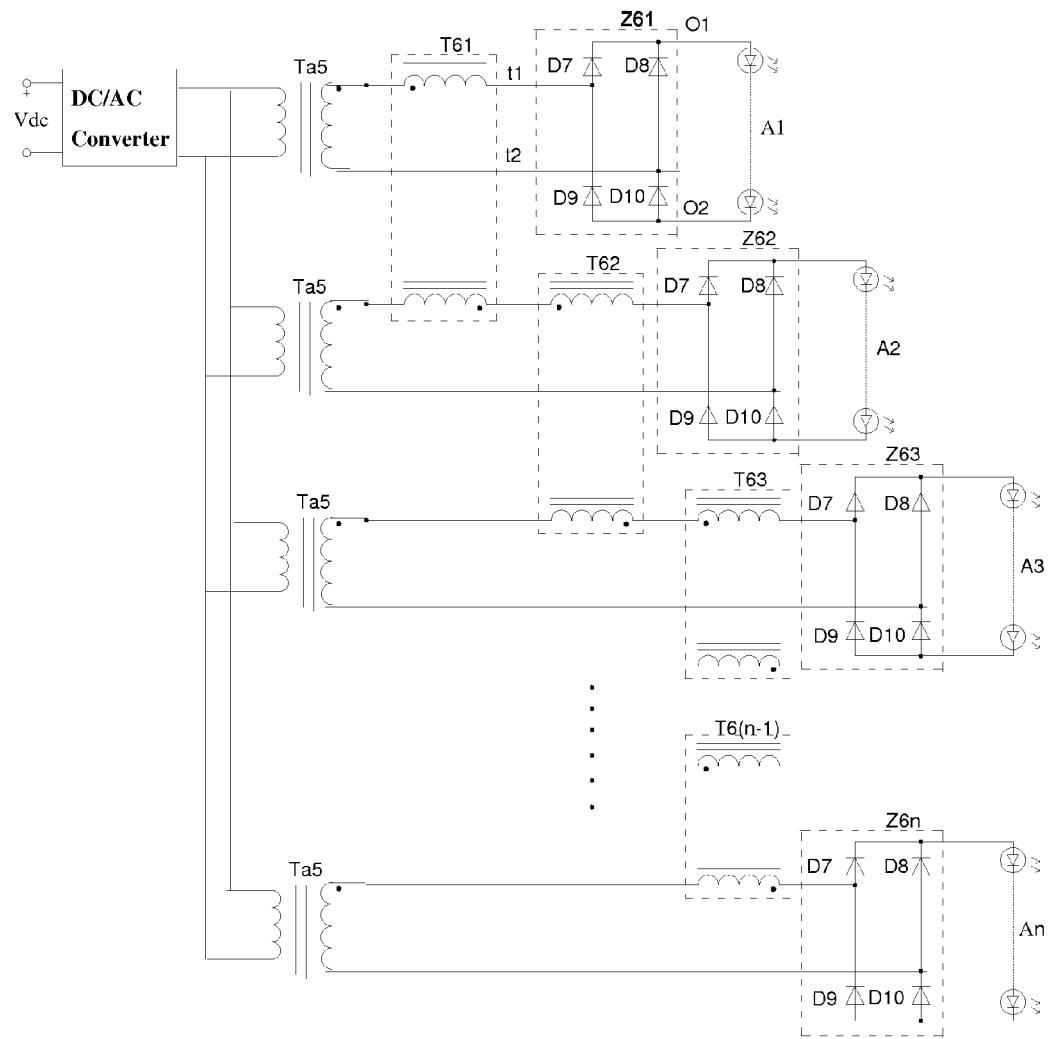
Figure 9E:
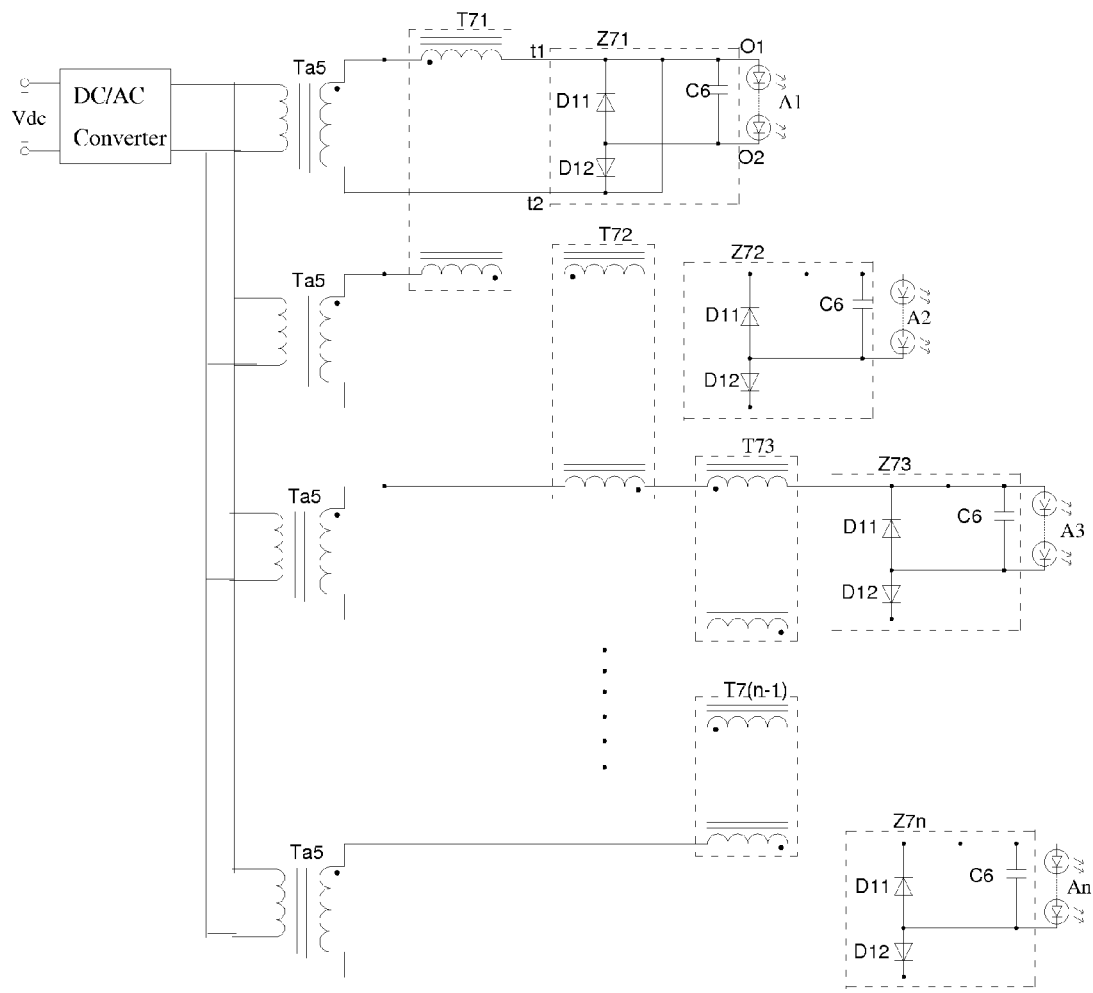

When the number of branches in the multipath constant-current driving circuit shown in FIG. 7 is 2, the multipath constant-current driving circuit may have a structure shown in FIG. 7a, which is omitted here in the interest of clarity.

Moreover, in the multipath constant-current driving circuits shown in FIGS. 3 to 7a, the main transformer includes one primary winding and one secondary winding. However, in practice, the main transformer may include one primary winding and at least two secondary windings. Preferably, the number of secondary windings is the same as that of rectification and filtering units or load branches, where there is a one-to-one-to-one correspondence between the secondary windings, the rectification and filtering units and the load branches. FIGS. 8a to 8e illustrate the multipath constant-current driving circuits shown in FIGS. 3 to 7 with their main transformers replaced with a transformer including one primary winding and at least two secondary windings. In this case, the first terminal of each of the secondary windings is connected to the first input terminal of a rectification and filtering unit corresponding to the secondary winding, and the second terminal of the secondary winding is connected to the second input terminal of the rectification and filtering unit corresponding to the secondary winding, so that a power supply loop is formed.

Alternatively, the main transformer may include at least two primary windings and at least two secondary windings. Preferably, there is a one-to-one-to-one-to-one correspondence between the primary windings, the secondary windings, the rectification and filtering units and the load branches. FIGS. 9a to 9e illustrate the multipath constant-current driving circuits shown in FIGS. 3 to 7 with their main transformers replaced with a transformer including at least two primary windings and at least two secondary windings. In this case, the first terminal of each of the secondary windings is connected to the first input terminal of a rectification and filtering unit corresponding to the secondary winding, and the second terminal of the secondary winding is connected to the second input terminal of the rectification and filtering unit corresponding to the secondary winding, so that a power supply loop is formed.

According to an embodiment of the present invention, it is also provided a multipath constant-current driving circuit. Specifically, the multipath constant-current driving circuit includes a DC/AC converter and a main transformer, and further includes a power supply loop of at least two stages that corresponds to each secondary winding of the main transformer.

The DC/AC converter is adapted to provide an AC voltage for a primary winding of the main transformer.

Each of the stages of a power supply loop that corresponds to a secondary winding of the main transformer includes: a first terminal of the secondary winding connected to a second terminal of the secondary winding via second windings of all current-balancing transformers arranged in previous stages of the power supply loop, a first winding of a current-balancing transformer corresponding to both the current stage of the power supply loop and the next stage of the power supply loop, and a rectification and filtering unit in the current stage of the power supply loop sequentially.

Currents in the same direction flow through a dotted terminal of a first winding and a non-dotted terminal of a second winding of each of the current-balancing transformers, and the current-balancing transformer is for current balancing between two adjacent power supply loops.

Specific examples are given below.

As shown in FIGS. 10a to 10d, a current-balancing transformer is arranged between two adjacent stages of the power supply loop. In this specification, the current-balancing transformer between a stage and the next stage of a power supply loop is seen as a current-balancing transformer corresponding to both stages of the power supply loop. Each stage of the power supply loop includes not only a first winding of the current-balancing transformer corresponding to both the current stage and the next stage of the power supply loop, but also second windings of current-balancing transformers arranged in all previous stages of the power supply loop. Specifically, for example, the second stage of the power supply loop includes: the secondary winding of the main transformer Ta3, the second winding of the current-balancing transformer T111, the first winding of the current-balancing transformer T112, and the rectification and filtering unit corresponding to the stage of the power supply loop. Specifically, the first terminal of the secondary winding of the main transformer Ta3 is connected to the second terminal of the secondary winding via the second winding of the current-balancing transformer T111, the first winding of the current-balancing transformer T112, and the first input terminal and the second input terminal of the rectification and filtering unit Z112 sequentially, so that the second stage of the power supply loop is formed. The third to the Nth stages of the power supply loop are similar. For example, the (N−1)th stage of the power supply loop includes: the first terminal of the secondary winding connected to the second terminal of the secondary winding via the second winding of the current-balancing transformer T111, the second winding of the current-balancing transformer T112 . . . , the second winding of the current-balancing transformer T11(N−2), the first winding of the current-balancing transformer T11 (N−1), and the rectification and filtering unit Z11(N−1) sequentially. The Nth stage of the power supply loop includes: the first terminal of the secondary winding connected to the second terminal of the secondary winding via the second winding of the current-balancing transformer T111, the second winding of the current-balancing transformer T112 . . . , the second winding of the current-balancing transformer T11(N−1), and the rectification and filtering unit Z11N sequentially (there is no current-balancing transformer T11N because the Nth stage of the power supply loop is the last one).

The differences between FIGS. 10a to 10d lie in the structure of the rectification and filtering unit, which is illustrated in FIGS. 2 to 9e and therefore omitted here in the interest of clarity.

Moreover, in the multipath constant-current driving circuits shown in FIGS. 10a to 10d, the main transformer includes one primary winding and one secondary winding. However, in practice, the main transformer may be: a transformer including one primary winding and at least two secondary windings; or a transformer including at least two primary windings and at least two secondary windings, where there is a one-to-one correspondence between the primary windings and the secondary windings. In this case, each of the secondary windings may correspond to a power supply loop of multiply stages, to form a constant-current driving circuit. In addition, different rectification and filtering units may be used in power supply loops corresponding to different secondary windings, for rectification and filtering. The present invention is not limited to any specific implementation.

Furthermore, in practice, the power supply loop of multiple stages may be implemented in such a way that: each of some (at least one) of all the secondary windings corresponds to a power supply loop of at least two stages, and the other secondary windings form a power supply loop to supply electric power to the loads and realize current balancing using a circuit structure in the prior art or any of the various power supply loops described in conjunction with FIGS. 3 to 9e. The present invention is not limited to any specific implementation.

For example, the circuit structures shown in FIGS. 3 to 10a may be combined in the same multipath constant-current driving circuit.

Figure 10A:
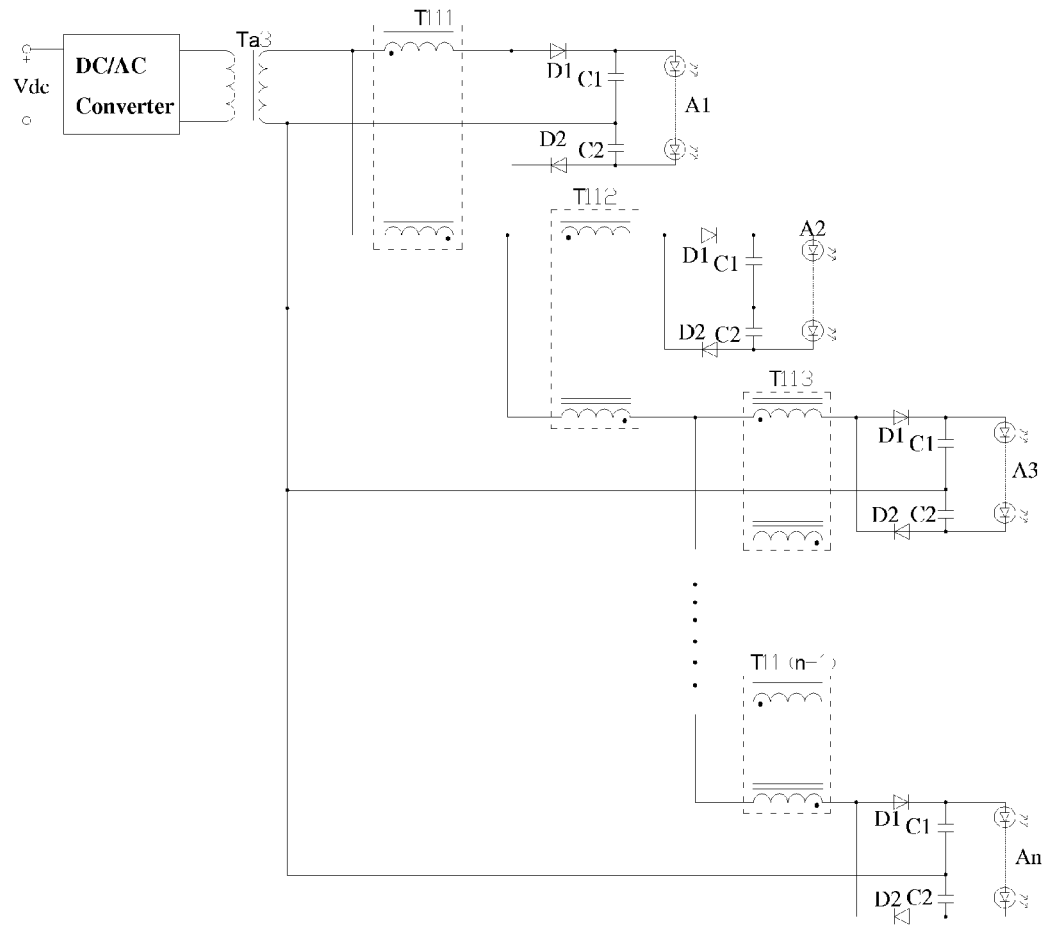
FIGS. 10a to 10d are structural diagrams illustrating a sixth multipath constant-current driving circuit according to the present invention with different rectification and filtering unit structures.
Figure 10B:
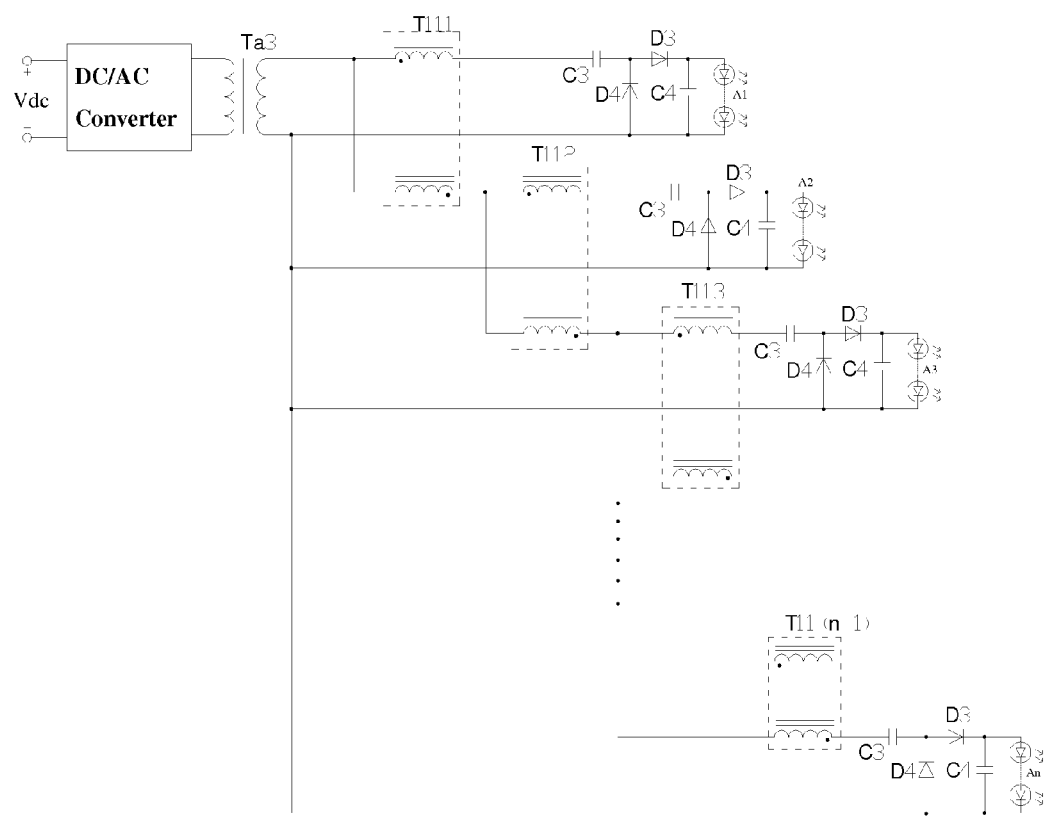
Figure 10C:
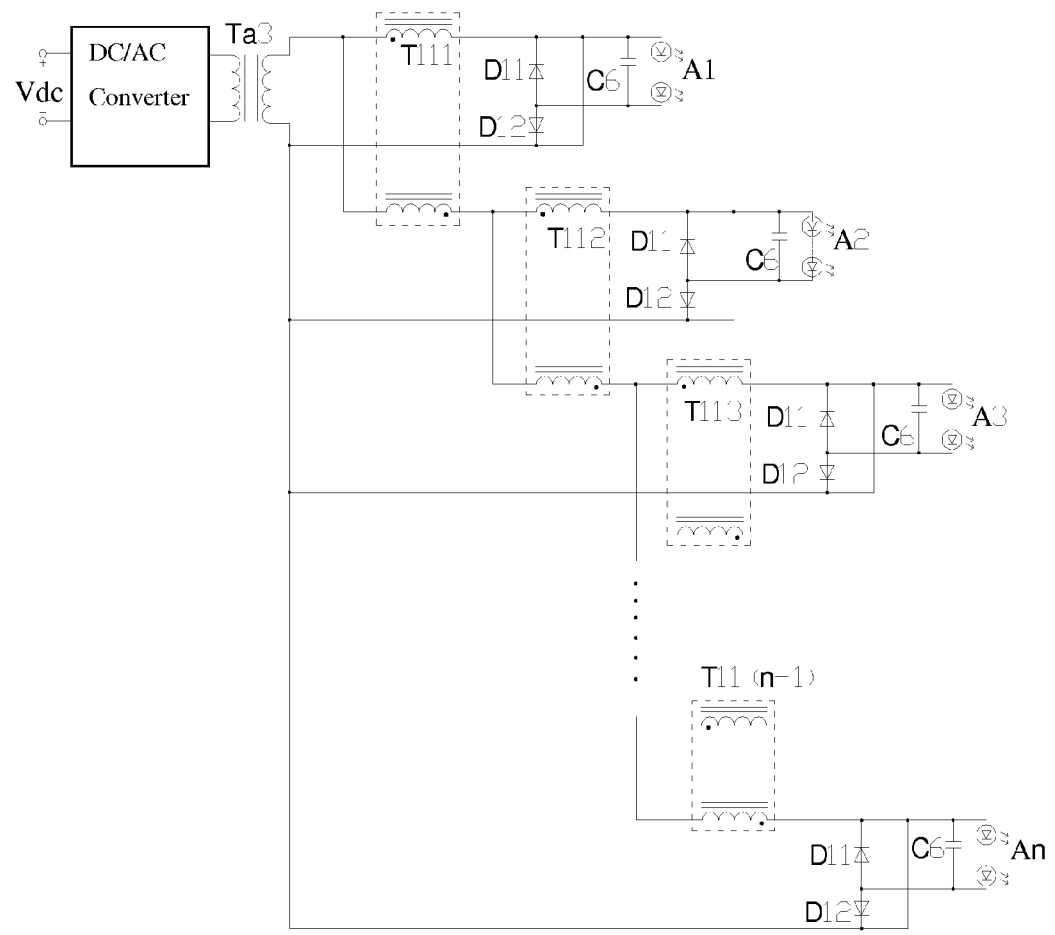
Figure 10D:
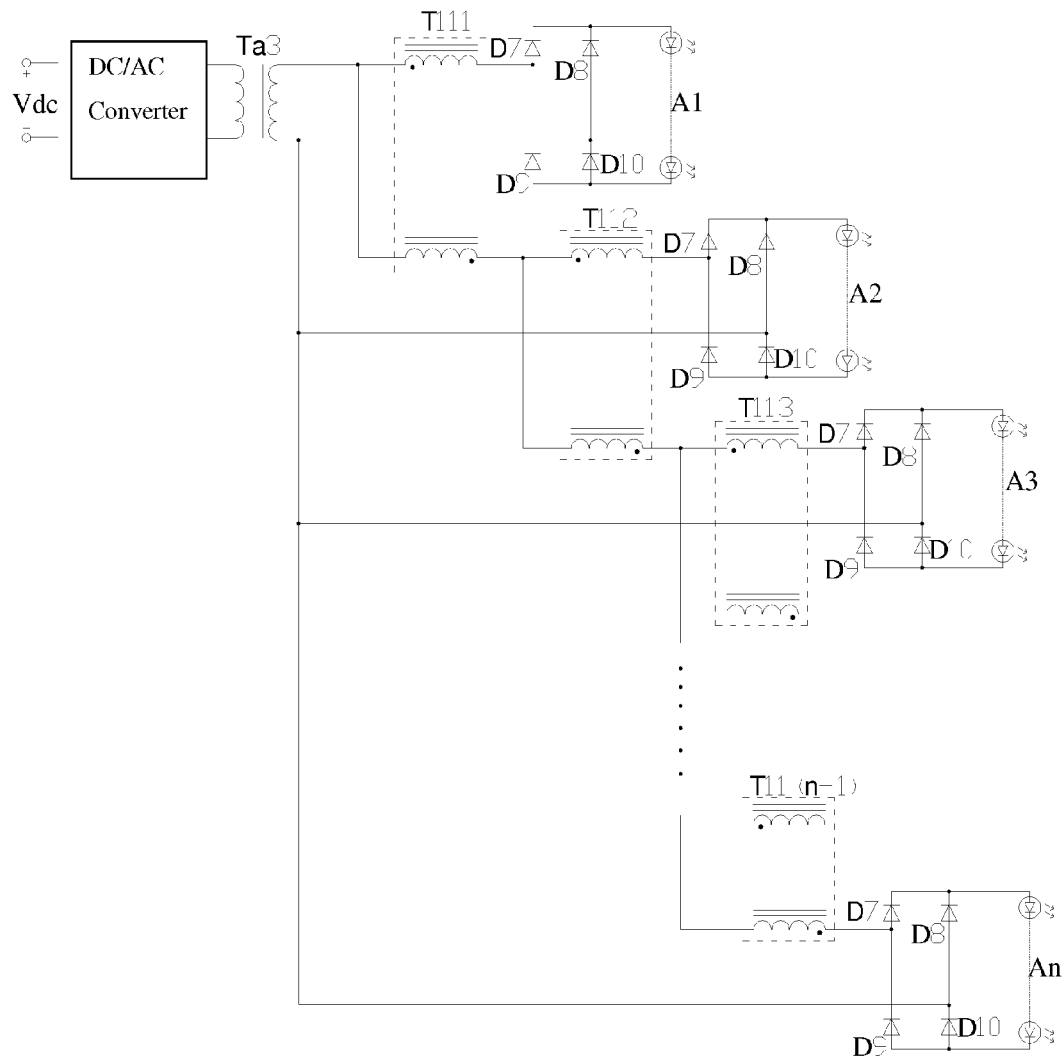

For the driving circuit shown in FIG. 3, all the power supply branches (the number of which is set to be M, where M>=2) that are connected to the secondary winding and are connected in parallel to each other to form the constant-current driving circuit can be seen as a first power supply branch group; and for the driving circuit shown in FIG. 10a, all the power supply branches that are connected to the secondary winding to form the multi-stage constant-current driving circuit can be seen as a second power supply branch group.

Figure 11A:
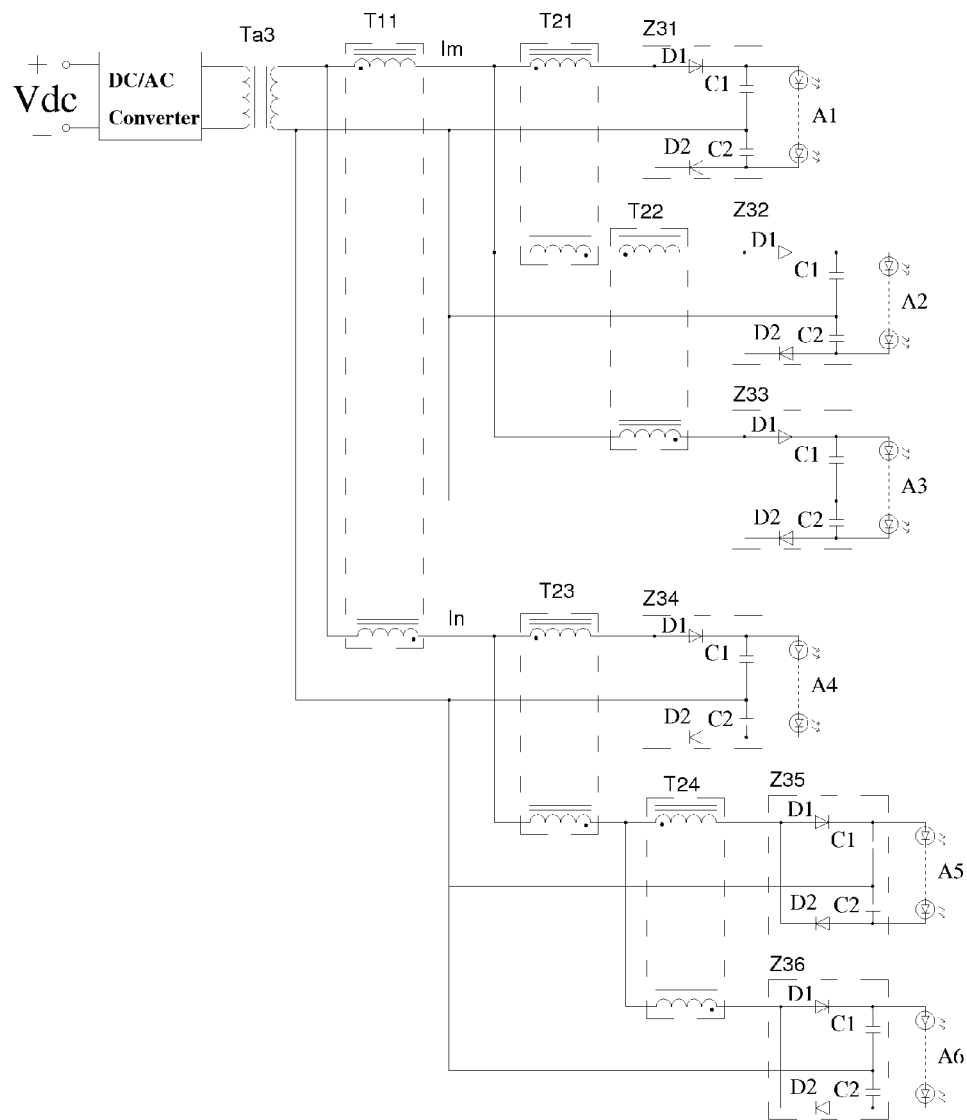
FIGS. 11a to 11i are structural diagrams illustrating a sixth multipath constant-current driving circuit according to the present invention.

Then, as shown in FIG. 11a, the main transformer includes one primary winding and one secondary winding. The input terminals of each of the first power supply branch group and the second power supply branch group are connected to the two terminals of the secondary winding of the main transformer. That is, the first power supply branch group and the second power supply branch group are connected to the same secondary winding in parallel. The first power supply branch group and the secondary winding form a first main power supply loop, and the second power supply branch group and the secondary winding form a second main power supply loop. In this case, in order to balance the total current Im in the first main power supply loop and the total current In in the second main power supply loop, a current-balancing transformer may be arranged between the two main power supply loops. Specifically, a first winding of the current-balancing transformer is arranged between the secondary winding and the input terminals of the first power supply branch group in the first main power supply loop, and a second winding of the current-balancing transformer is arranged between the secondary winding and the input terminals of the second power supply branch group in the second main power supply loop.

Figure 11B:
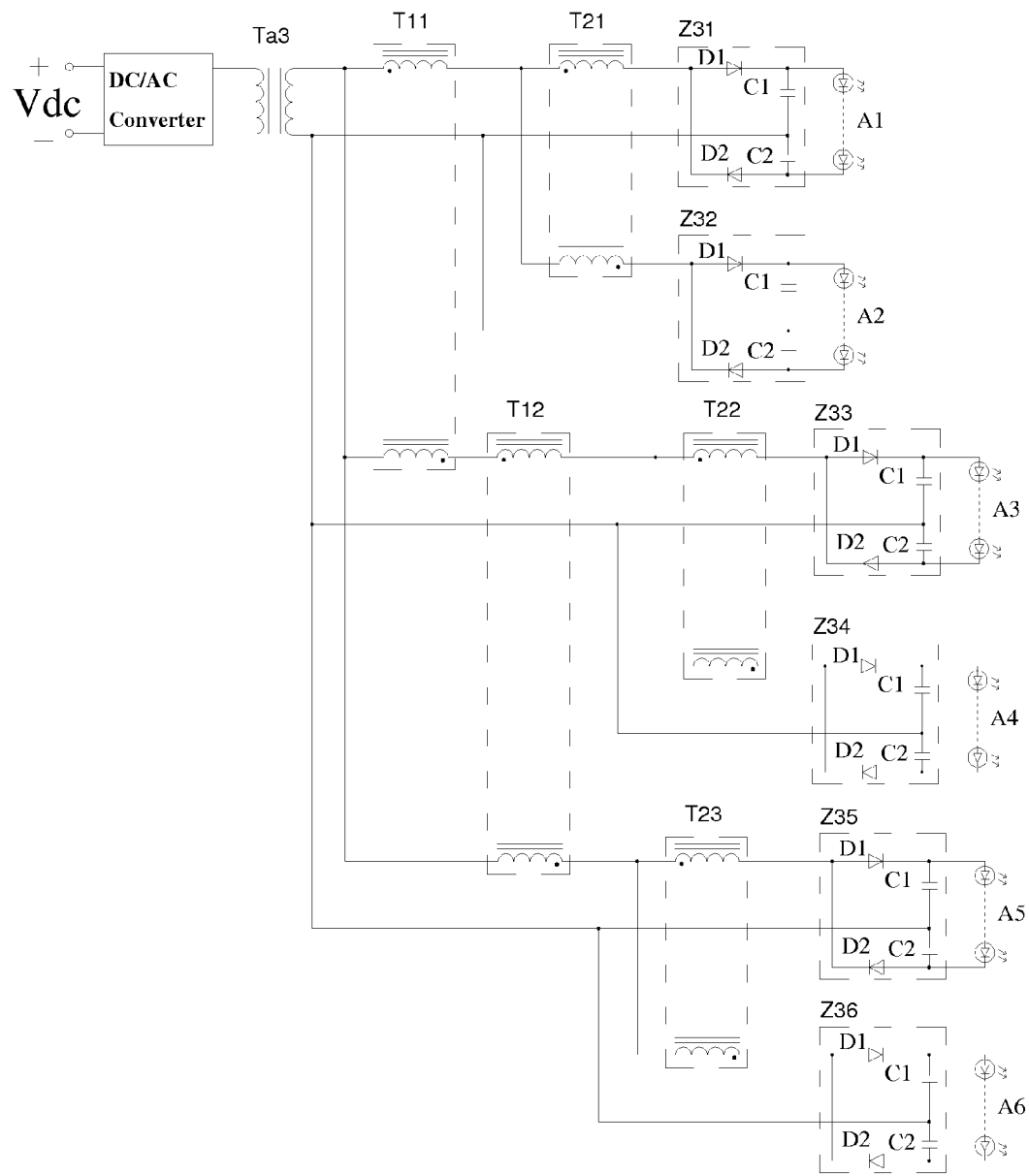
Figure 11C:
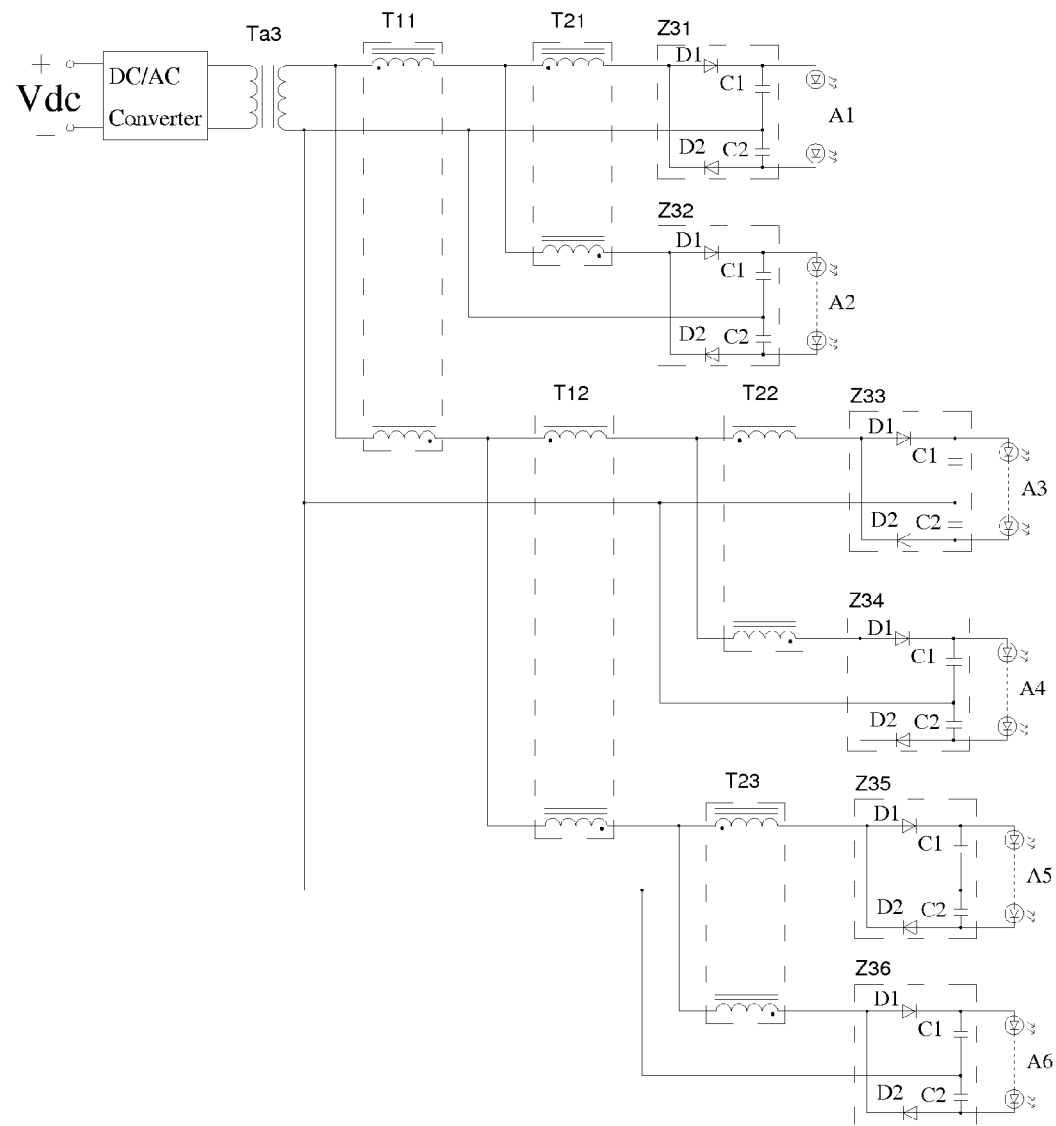
Figure 11D:
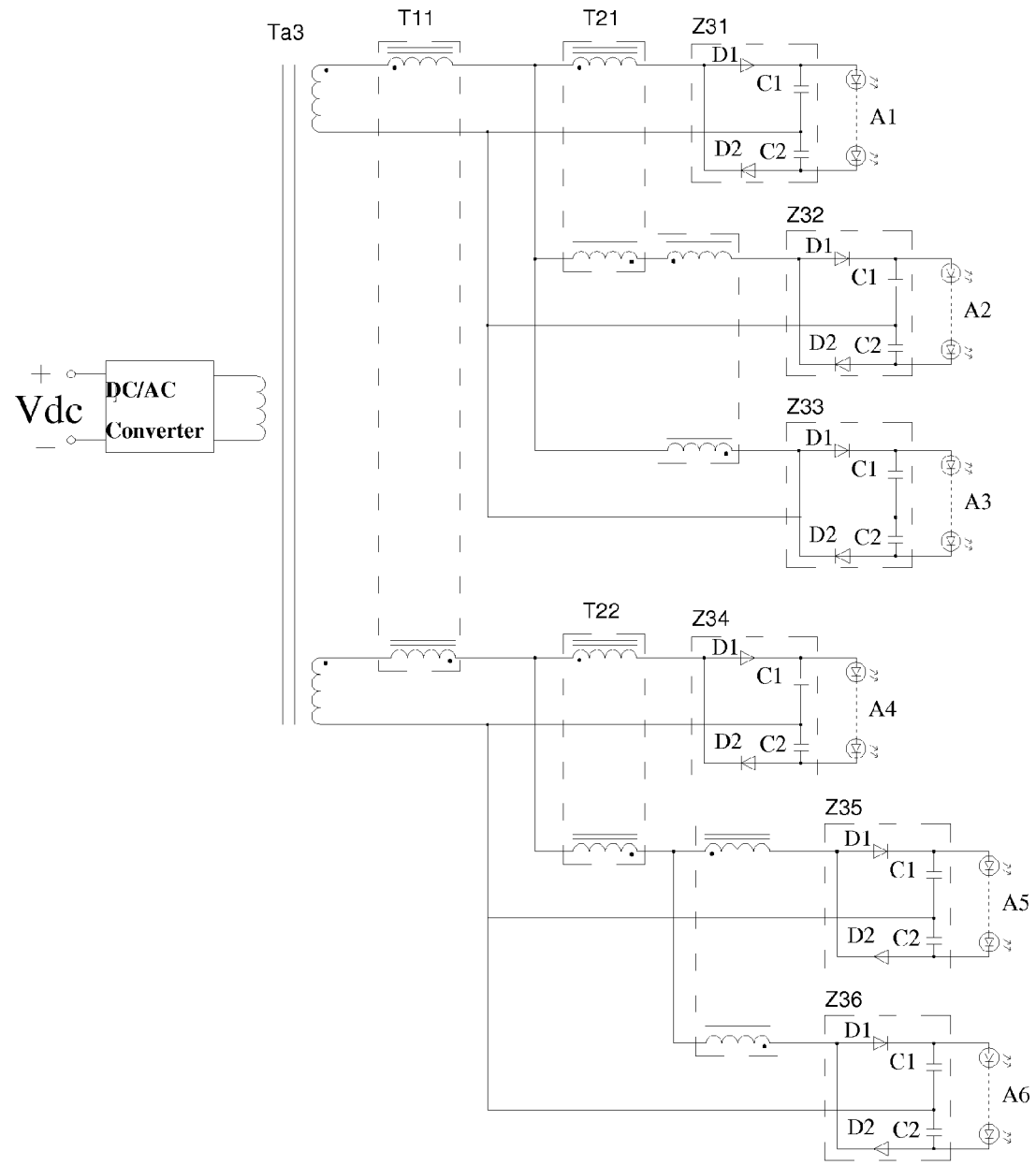
Figure 11E:
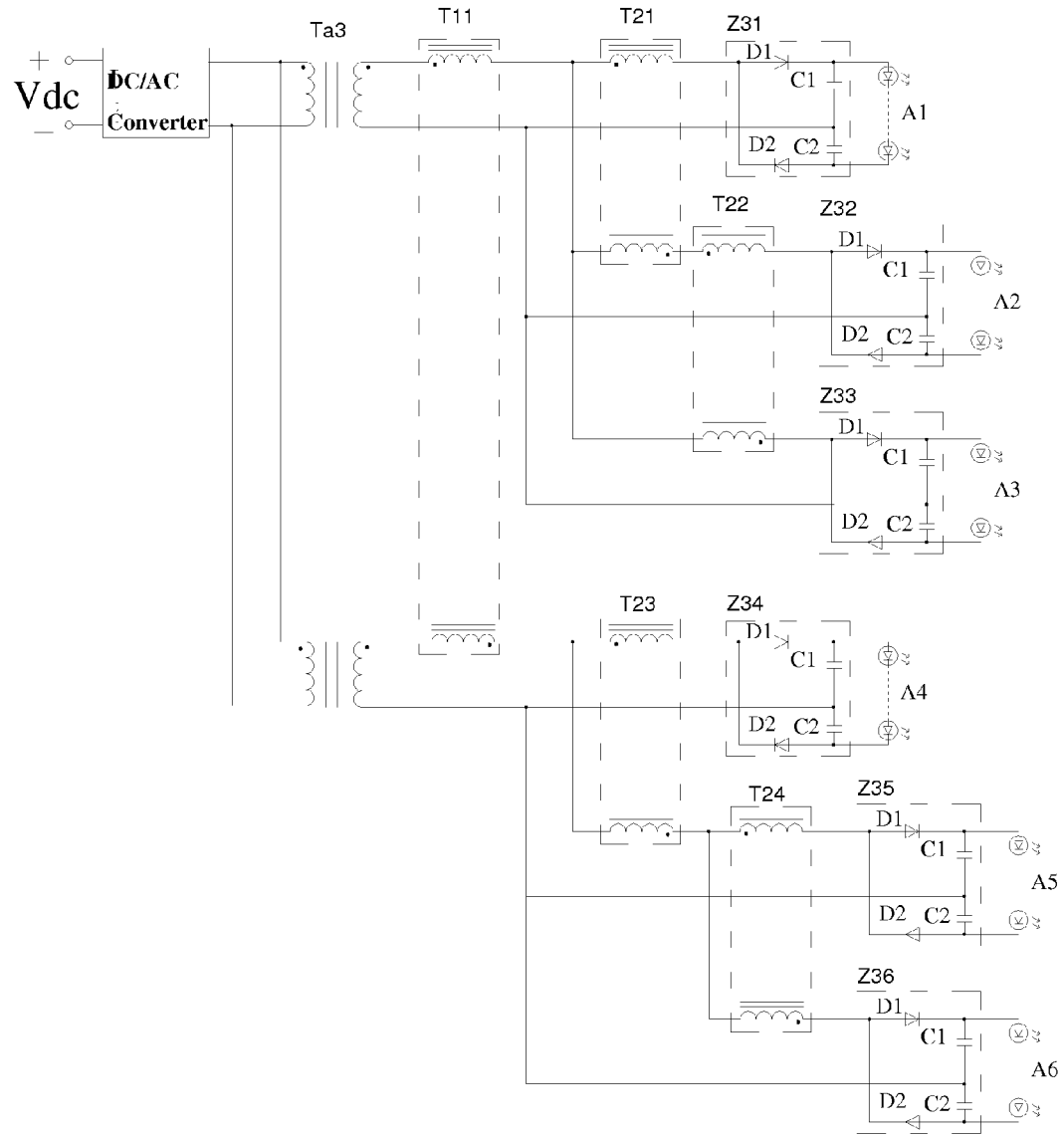
Figure 11F:
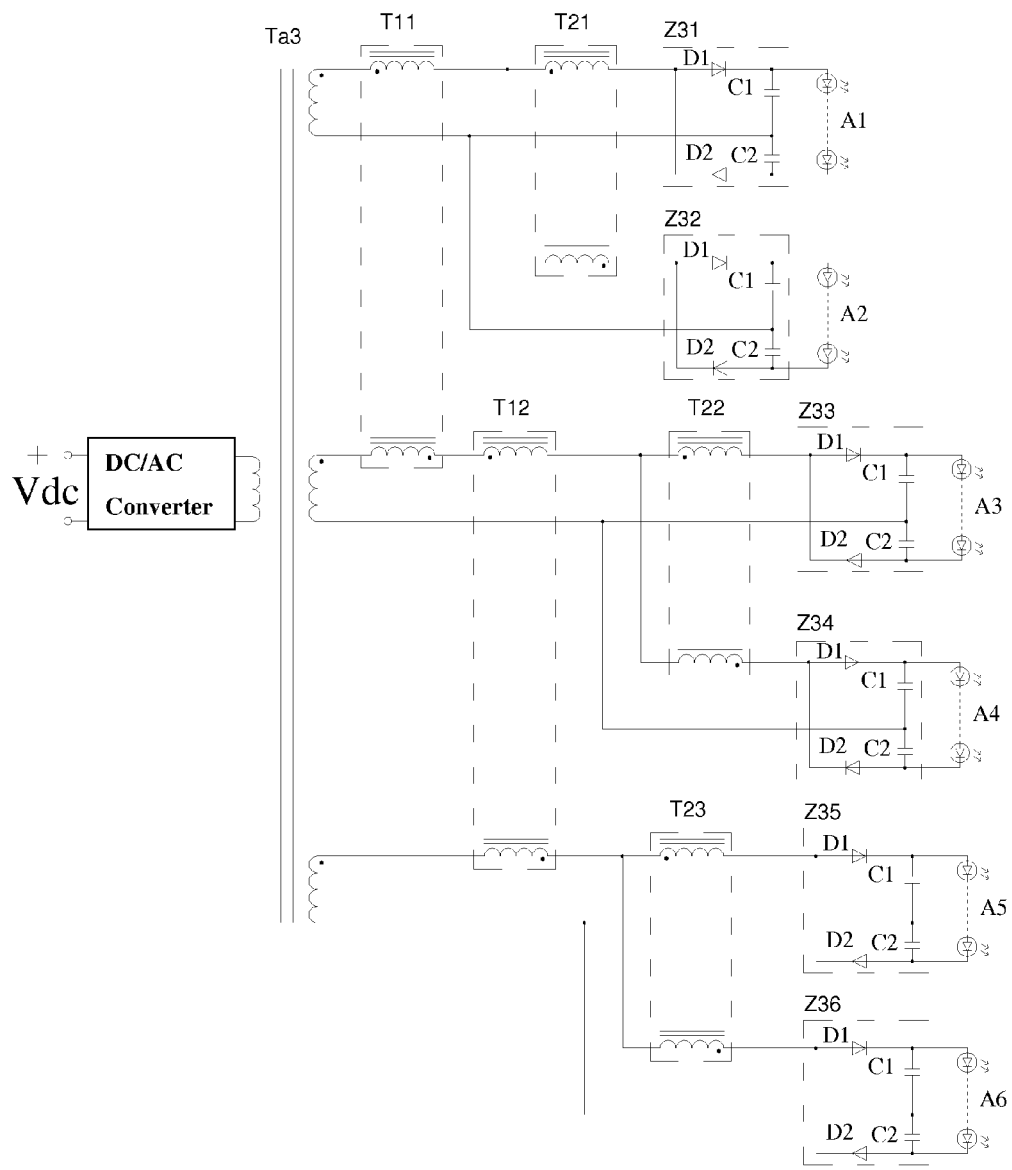
Figure 11G:
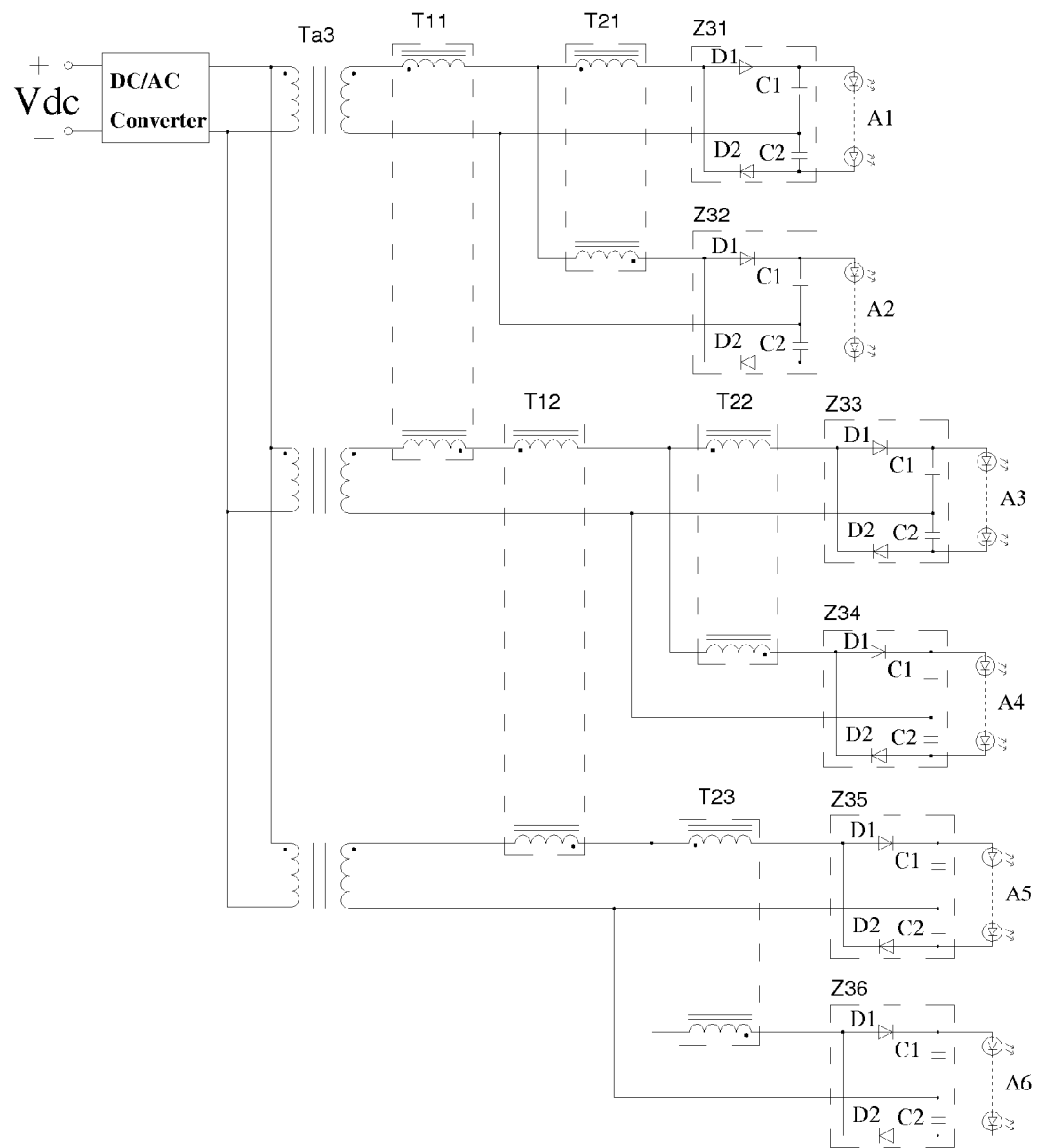
Figure 11H:
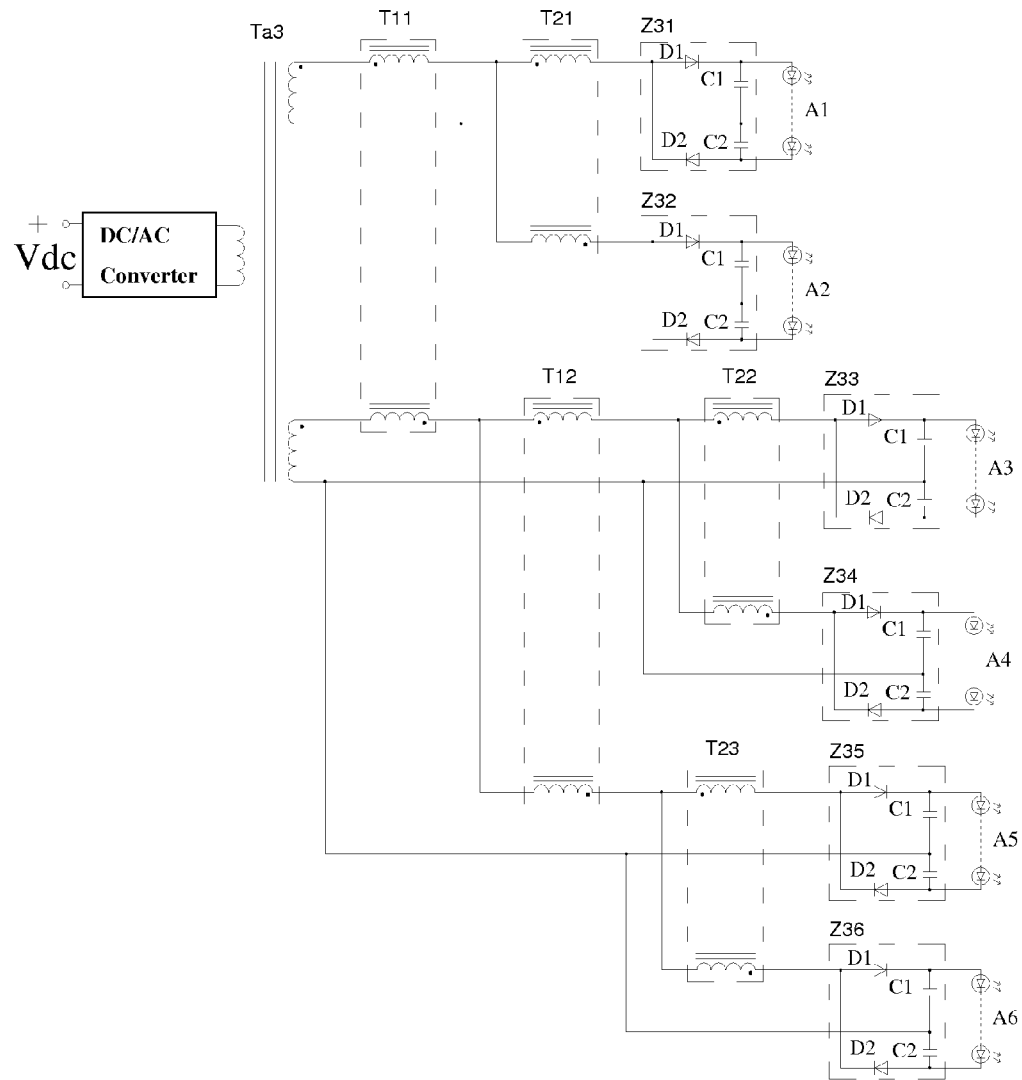
Figure 11I:
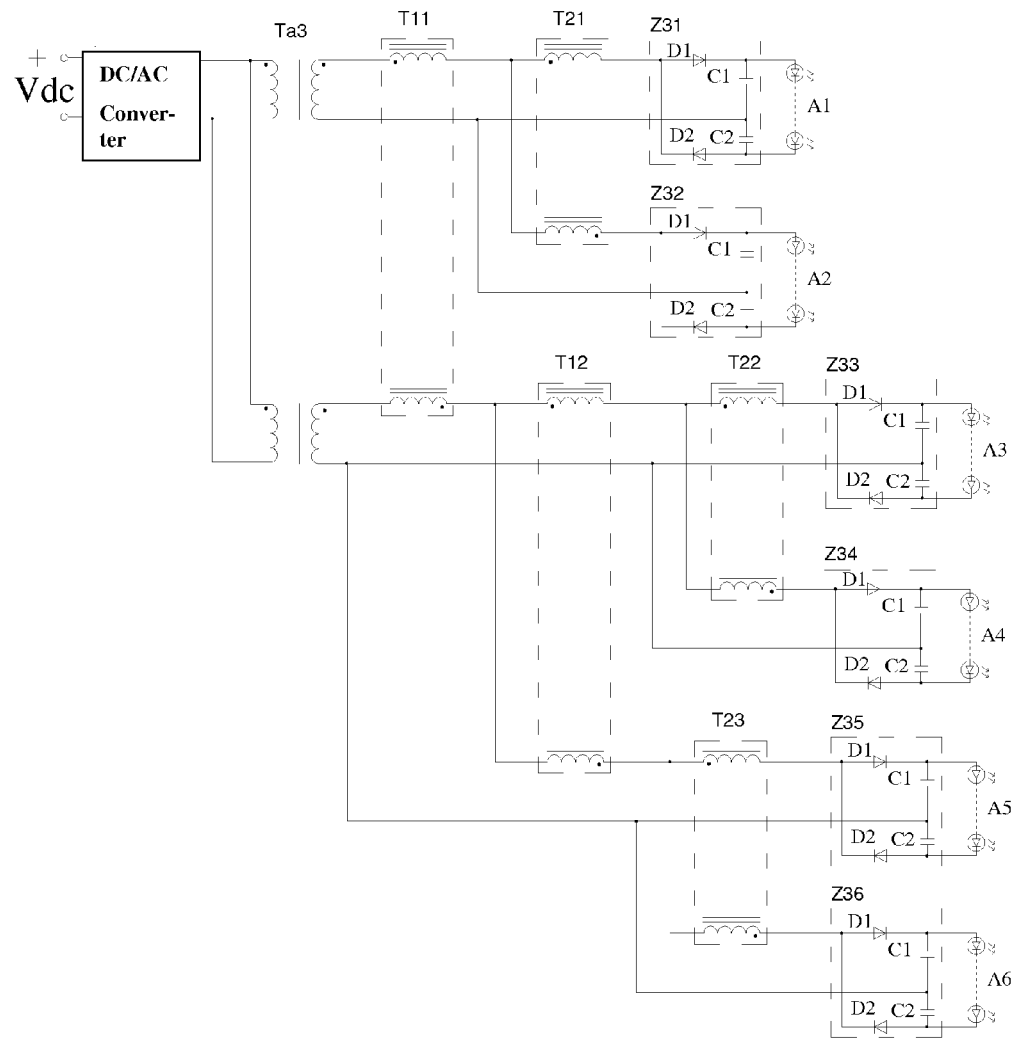
Figure 12A:
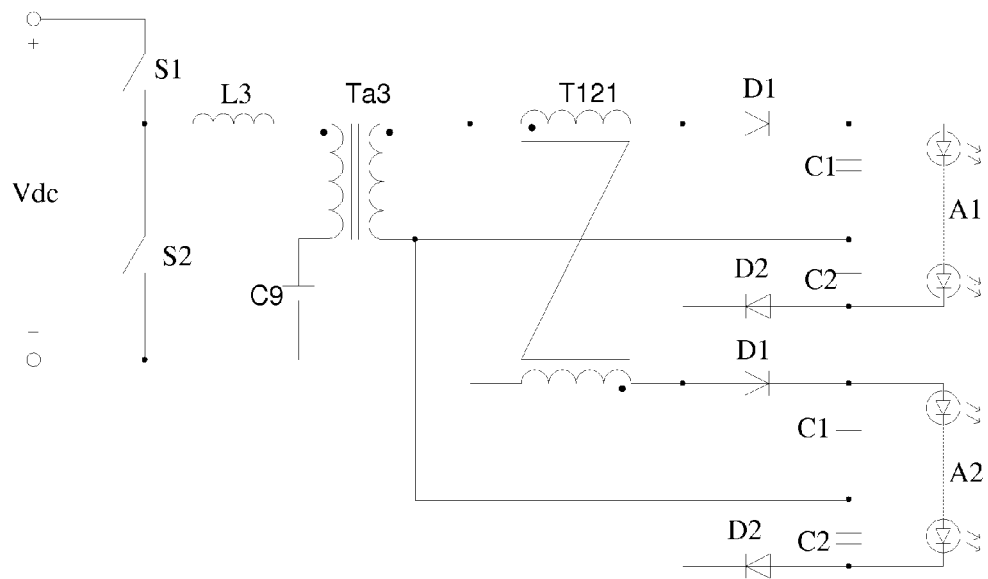
FIGS. 12a to 12f are structural diagrams illustrating a multipath constant-current driving circuit according to the present invention with different DC/AC converter structures.
Figure 12B:
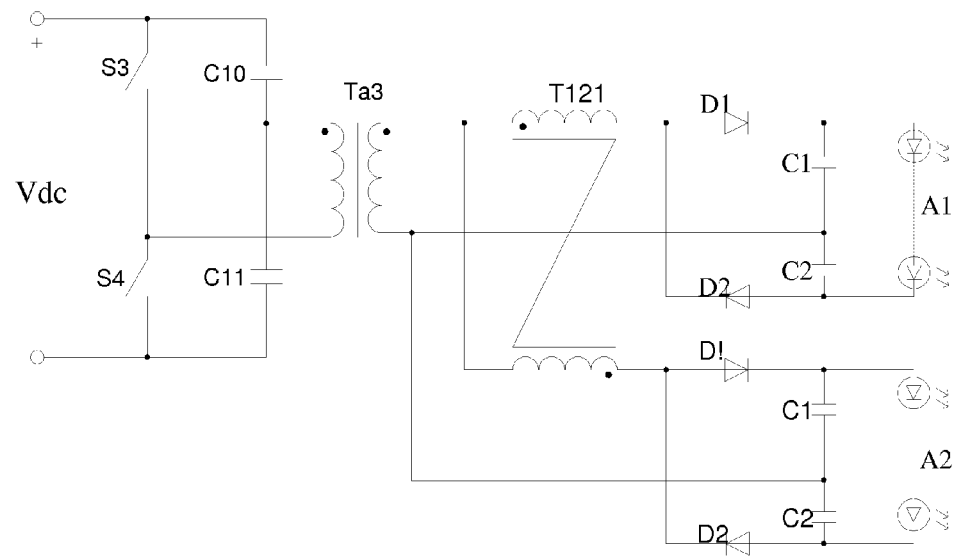
Figure 12C:
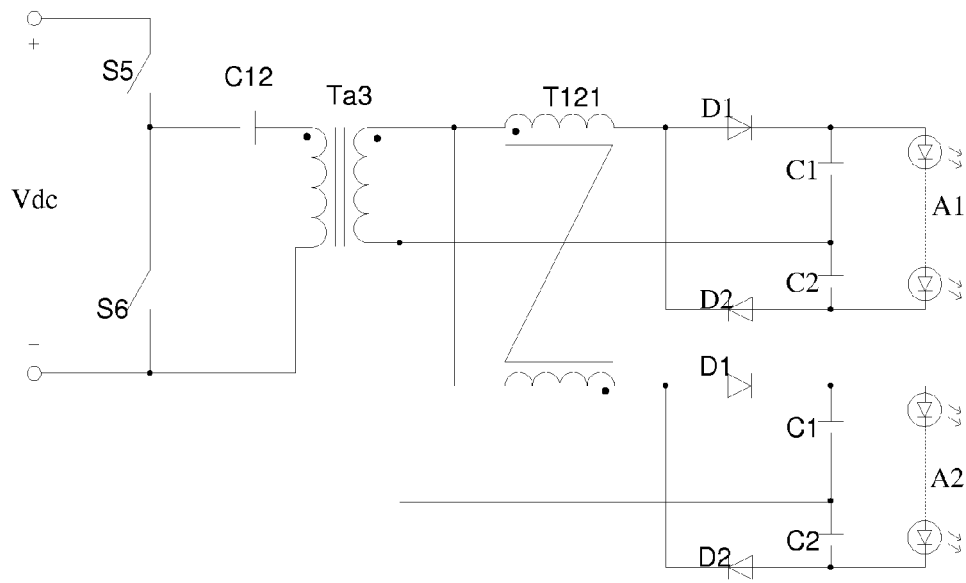
Figure 12D:
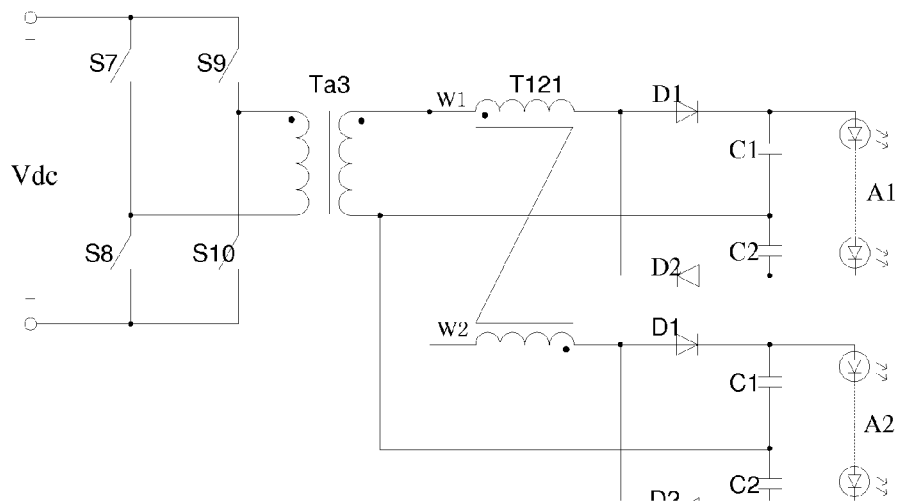
Figure 12E:
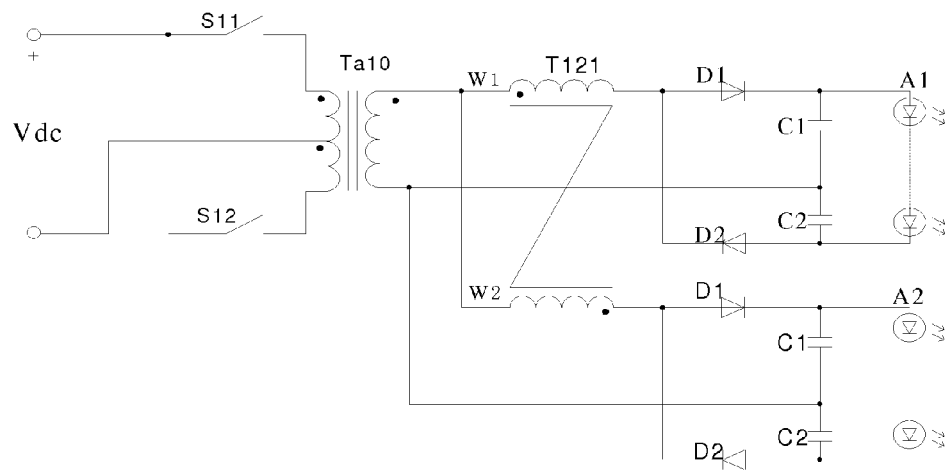
Figure 12F:
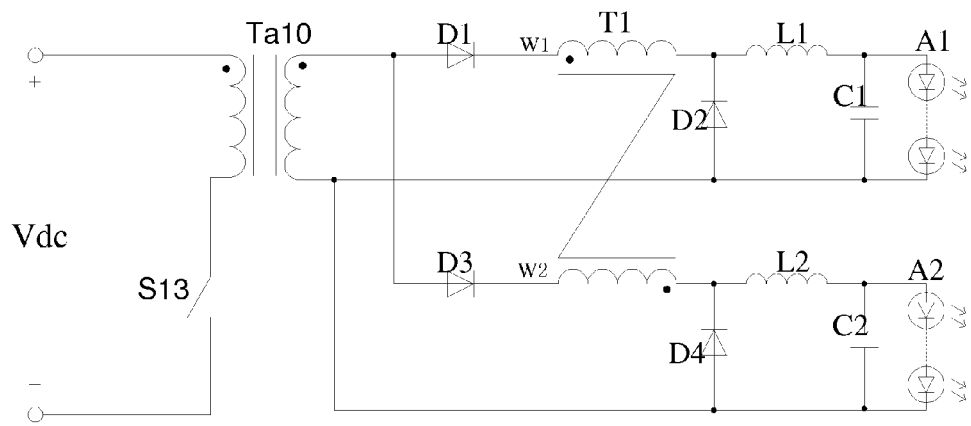

Correspondingly, such a circuit can be extended to various cases where the multipath constant-current driving circuit according to the present invention includes at least one first power supply branch group and at least one second power supply branch group, or where the multipath constant-current driving circuit according to the present invention includes at least two first power supply branch groups and at least two second power supply branch groups. For example, FIGS. 11b to 11c. Moreover, the circuit shown in FIG. 11a may be extended to the case where the main transformer includes one primary winding and multiple secondary windings, or where the main transformer includes multiple primary windings and multiple secondary windings, as shown in FIGS. 11d to 11i.

Preferably, the DC/AC converter in the multipath constant-current driving circuit above may be implemented as any one of a bridge circuit, a push-pull circuit, a flyback circuit, a forward circuit, a series resonant circuit, an LLC-type resonant circuit and a soft-switched circuit.

For example, as shown in FIGS. 12a-12f, the DC/AC converters in respective multipath constant-current driving circuits are a bridge circuit, a push-pull circuit, a flyback circuit, a forward circuit, a series resonant circuit, an LLC-type resonant circuit and a soft-switched circuit, respectively.

Preferred embodiments of the present invention are described above for illustrative purposes only. It should be noted that modifications and alternations may be made by those skilled in the art without deviation from the scope of the present invention. These modifications and alternations shall fall within the scope of protection of the present invention.

The invention claimed is:

1. A multipath constant-current driving circuit, wherein, the multipath constant-current driving circuit comprises: a DC/AC converter, a main transformer and at least two rectification and filtering units,
    the DC/AC converter is adapted to provide an alternating current (AC) voltage for a primary winding of the main transformer;
    each of the at least two rectification and filtering units forms a power supply loop with a secondary winding of the main transformer; each of the power supply loops comprises: a first terminal of the secondary winding connected to a first input terminal of a corresponding rectification and filtering unit, and a second terminal of the secondary winding connected to a second input terminal of the corresponding rectification and filtering unit; and
    a current-balancing transformer is arranged between power supply loops where adjacent rectification and filtering units are in; a first winding of the current-balancing transformer is arranged between a first terminal of a secondary winding and a rectification and filtering unit in a first power supply loop; a second winding of the current-balancing transformer is arranged between a first terminal of a secondary winding and a rectification and filtering unit in a second power supply loop; currents in the same direction flow through a dotted terminal of the first winding of the current-balancing transformer and a non-dotted terminal of the second winding of the current-balancing transformer, and the current-balancing transformer is for current balancing between the power supply loops where the adjacent rectification and filtering units are in.

2. The circuit according to claim 1, wherein, the dotted terminal of the first winding of the current-balancing transformer is connected to the first terminal of the secondary winding in the first power supply loop, and a non-dotted terminal of the first winding of the current-balancing transformer is connected to a first input terminal of the rectification and filtering unit in the first power supply loop; and
    the non-dotted terminal of the second winding of the current-balancing transformer is connected to the first terminal of the secondary winding in the second power supply loop, and a dotted terminal of the second winding of the current-balancing transformer is connected to a first input terminal of the rectification and filtering unit in the second power supply loop.

3. The circuit according to claim 1, wherein, the main transformer is:
    a transformer comprising one primary winding and one secondary winding; or
    a transformer comprising one primary winding and at least two secondary windings; or
    a transformer comprising at least two primary windings and at least two secondary windings, where there is a one-to-one correspondence between the primary windings and the secondary windings.

4. The circuit according to claim 1, wherein, the rectification and filtering unit comprises a first diode, a second diode, a first capacitor and a second capacitor, wherein
    the first diode and the first capacitor are connected in series sequentially between a first input terminal and a second input terminal of the rectification and filtering unit; the second diode and the second capacitor are connected in series sequentially between the first input terminal and the second input terminal of the rectification and filtering unit; and an anode of the first diode is connected to the first input terminal of the rectification and filtering unit, a cathode of the second diode is connected to the first input terminal of the rectification and filtering unit.

5. The circuit according to claim 1, wherein, the rectification and filtering unit comprises a third diode, a fourth diode, a third capacitor and a fourth capacitor, wherein
    the third capacitor, the third diode and the fourth capacitor are connected in series sequentially between a first input terminal and a second input terminal of the rectification and filtering unit; and a cathode of the fourth diode is connected to an anode of the third diode, an anode of the fourth diode is connected to the second input terminal of the rectification and filtering unit.

6. The circuit according to claim 1, wherein, the rectification and filtering unit comprises a fifth diode, a sixth diode, a first inductor, a second inductor and a fifth capacitor, wherein the fifth diode and the sixth diode are connected in series sequentially between a first input terminal and a second input terminal of the rectification and filtering unit, and an anode of the fifth diode is connected to an anode of the sixth diode; the first inductor and the second inductor are connected in series sequentially between the first input terminal and the second input terminal of the rectification and filtering unit, and a first terminal of the fifth capacitor is connected to the anode of the fifth diode, a second terminal of the fifth capacitor is connected to a point where the first inductor is connected to the second inductor.

7. The circuit according to claim 1, wherein, the rectification and filtering unit comprises a seventh diode, a eighth diode, a ninth diode and a tenth diode, wherein
the seventh diode and the eighth diode are connected in series between a first input terminal and a second input terminal of the rectification and filtering unit, and a cathode of the seventh diode is connected to a cathode of the eighth diode; the ninth diode and the tenth diode are connected in series between the first input terminal and the second input terminal of the rectification and filtering unit, and an anode of the ninth diode is connected to an anode of the tenth diode.

8. The circuit according to claim 1, wherein, the DC/AC converter is any one of a bridge circuit, a push-pull circuit, a series resonant circuit, and an LLC-type resonant circuit.

9. The circuit according to claim 1, wherein, the main transformer comprises at least two independent transformers, each of the independent transformers comprises at least one primary winding and at least one secondary windings, each of all secondary windings corresponds to a rectification and filtering unit; and each of all secondary windings forms a power supply loop with a rectification and filtering unit that corresponds to the secondary winding.

10. A multipath constant-current driving circuit, wherein, the multipath constant-current driving circuit comprises: a DC/AC converter and a main transformer, and further comprises a power supply loop of at least two stages that corresponds to each secondary winding of the main transformer, wherein
the DC/AC converter is adapted to provide an AC voltage for a primary winding of the main transformer;
each of the stages of a power supply loop that corresponds to a secondary winding of the main transformer comprises: a first terminal of the secondary winding connected to a second terminal of the secondary winding via second windings of all current-balancing transformers arranged in previous stages of the power supply loop, a first winding of a current-balancing transformer corresponding to both the current stage of the power supply loop and the next stage of the power supply loop, and a rectification and filtering unit in the current stage of the power supply loop sequentially; and
currents in the same direction flow through a dotted terminal of a first winding and a non-dotted terminal of a second winding of each of the current-balancing transformers, and the current-balancing transformer is for current balancing between two adjacent power supply loops.

11. The circuit according to claim 10, wherein, the rectification and filtering unit comprises a first diode, a second diode, a first capacitor and a second capacitor, wherein
the first diode and the first capacitor are connected in series sequentially between a first input terminal and a second input terminal of the rectification and filtering unit; the second diode and the second capacitor are connected in series sequentially between the first input terminal and the second input terminal of the rectification and filtering unit; and an anode of the first diode is connected to the first input terminal of the rectification and filtering unit, a cathode of the second diode is connected to the first input terminal of the rectification and filtering unit.

12. The circuit according to claim 10, wherein, the rectification and filtering unit comprises a third diode, a fourth diode, a third capacitor and a fourth capacitor, wherein
the third capacitor, the third diode and the fourth capacitor are connected in series sequentially between a first input terminal and a second input terminal of the rectification and filtering unit; and a cathode of the fourth diode is connected to an anode of the third diode, an anode of the fourth diode is connected to the second input terminal of the rectification and filtering unit.

13. The circuit according to claim 10, wherein, the rectification and filtering unit comprises a fifth diode, a sixth diode, a first inductor, a second inductor and a fifth capacitor, wherein
the fifth diode and the sixth diode are connected in series sequentially between a first input terminal and a second input terminal of the rectification and filtering unit, and an anode of the fifth diode is connected to an anode of the sixth diode; the first inductor and the second inductor are connected in series sequentially between the first input terminal and the second input terminal of the rectification and filtering unit, and a first terminal of the fifth capacitor is connected to the anode of the fifth diode, a second terminal of the fifth capacitor is connected to a point where the first inductor is connected to the second inductor.

14. The circuit according to claim 10, wherein, the rectification and filtering unit comprises a seventh diode, a eighth diode, a ninth diode and a tenth diode, wherein
the seventh diode and the eighth diode are connected in series between a first input terminal and a second input terminal of the rectification and filtering unit, and a cathode of the seventh diode is connected to a cathode of the eighth diode; the ninth diode and the tenth diode are connected in series between the first input terminal and the second input terminal of the rectification and filtering unit, and an anode of the ninth diode is connected to an anode of the tenth diode.

15. The circuit according to claim 10, wherein the main transformer is:
a transformer comprising one primary winding and one secondary winding; or
a transformer comprising one primary winding and at least two secondary windings; or
a transformer comprising at least two primary windings and at least two secondary windings, where there is a one-to-one correspondence between the primary windings and the secondary windings.

16. The circuit according to claim 10, wherein, the DC/AC converter is any one of a bridge circuit, a push-pull circuit, a series resonant circuit, and an LLC-type resonant circuit.

17. A multipath constant-current driving circuit, wherein, the multipath constant-current driving circuit comprises: a DC/AC converter, a main transformer and at least two power supply branch groups,
the DC/AC converter is adapted to provide an AC voltage for a primary winding of the main transformer;
the main transformer comprises at least one secondary winding;

each of the power supply branch groups forms a main power supply loop with the secondary winding of the main transformer; and a current-balancing transformer is arranged between two adjacent main power supply loops; a first winding of the current-balancing transformer is arranged in one of the two main power supply loops, and a second winding of the current-balancing transformer is arranged in the other one of the two main power supply loops, for current balancing between the two main power supply loops.

18. The circuit according to claim 17, wherein, at least one of the at least two main power supply loops comprises:

at least two power supply loops each of which is formed by a rectification and filtering unit and a corresponding secondary winding, and each of the power supply loops comprises: a first terminal of a secondary winding of the main transformer connected to a first input terminal of a corresponding rectification and filtering unit, and a second terminal of the secondary winding connected to a second input terminal of the corresponding rectification and filtering unit; and, a current-balancing transformer is arranged between power supply loops where two adjacent rectification and filtering units are in, a first winding of the current-balancing transformer is arranged between a first terminal of a secondary winding and a rectification and filtering unit in a first power supply loop, a second winding of the current-balancing transformer is arranged between a first terminal of a secondary winding and a rectification and filtering unit in a second power supply loop; currents in the same direction flow through a dotted terminal of the first winding of the current-balancing transformer and a non-dotted terminal of the second winding of the current-balancing transformer, and the current-balancing transformer is for current balancing between the power supply loops where the adjacent rectification and filtering units are in.

19. The circuit according to claim 17, wherein, at least one of the at least two main power supply loops comprises:

a power supply loop of at least two stages, and each of the stages of the power supply loops comprises: a first terminal of a corresponding secondary winding of the main transformer connected to a second terminal of the secondary winding via second windings of all current-balancing transformers arranged in previous stages of the power supply loop, a first winding of a current-balancing transformer corresponding to both the current stage of the power supply loop and the next stage of the power supply loop, and a rectification and filtering unit in the current stage of the power supply loop sequentially; currents in the same direction flow through a dotted terminal of a first winding and a non-dotted terminal of a second winding of each of the current-balancing transformers, and the current-balancing transformer is for current balancing between two adjacent power supply loops.

* * * * *